US010535143B2

(12) United States Patent
Matsumoto et al.

(10) Patent No.: US 10,535,143 B2
(45) Date of Patent: Jan. 14, 2020

(54) MONITORING DEVICE AND MONITORING METHOD

(71) Applicant: PANASONIC INTELLECTUAL PROPERTY MANAGEMENT CO., LTD., Osaka (JP)

(72) Inventors: Yuichi Matsumoto, Kanagawa (JP); Kazuma Yoshida, Saitama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 134 days.

(21) Appl. No.: 15/541,860

(22) PCT Filed: Jan. 29, 2016

(86) PCT No.: PCT/JP2016/000458
§ 371 (c)(1),
(2) Date: Jul. 6, 2017

(87) PCT Pub. No.: WO2016/136144
PCT Pub. Date: Sep. 1, 2016

(65) Prior Publication Data
US 2018/0033151 A1 Feb. 1, 2018

(30) Foreign Application Priority Data
Feb. 25, 2015 (JP) .................... 2015-035477

(51) Int. Cl.
*G06T 7/20* (2017.01)
*H04N 7/18* (2006.01)
(Continued)

(52) U.S. Cl.
CPC ................ *G06T 7/20* (2013.01); *G06F 21/84* (2013.01); *G06K 9/00771* (2013.01);
(Continued)

(58) Field of Classification Search
USPC .......... 348/135, 143, 169; 382/103; 386/241
See application file for complete search history.

(56) References Cited

U.S. PATENT DOCUMENTS

2009/0128632 A1\* 5/2009 Goto ..................... G01S 3/7864
348/169
2010/0119177 A1\* 5/2010 Suzuki ............... G06K 9/00771
382/307
(Continued)

FOREIGN PATENT DOCUMENTS

JP   2007-233919   9/2007
JP   2011-091705   5/2011
(Continued)

OTHER PUBLICATIONS

International Search Report issued in International Patent Application No. PCT/JP2016/000458, dated Apr. 19, 2016, along with English-language translation.

*Primary Examiner* — Thai Q Tran
*Assistant Examiner* — Stephen R Smith
(74) *Attorney, Agent, or Firm* — Greenblum & Bernstein, P.L.C.

(57) ABSTRACT

A monitoring device includes a masking invalid region setter that sets a masking invalid region in video of a monitoring area in accordance with a manipulation input of a user, a moving object detector that detects a moving object from the video of the monitoring area and acquires region information for each moving object, a process target selector that selects whether or not to set an image region of a moving object detected by the moving object detector as a target of the masking process in accordance with whether or not the image region is positioned in the masking invalid region, and a video output controller that generates and outputs an output video in which the masking process is implemented
(Continued)

only on an image region of a moving object set as a target of the masking process by the process target selector.

10 Claims, 18 Drawing Sheets

(51) Int. Cl.
    *G06T 7/70*     (2017.01)
    *G06F 21/84*     (2013.01)
    *G06K 9/00*     (2006.01)
    *G06T 7/00*     (2017.01)
    *H04N 5/232*     (2006.01)
    *H04N 5/91*     (2006.01)

(52) U.S. Cl.
    CPC .............. *G06T 7/0004* (2013.01); *G06T 7/70* (2017.01); *H04N 5/23229* (2013.01); *H04N 5/91* (2013.01); *H04N 7/18* (2013.01); *G06K 9/00362* (2013.01); *G06T 2207/10016* (2013.01); *G06T 2207/20092* (2013.01); *G06T 2207/30196* (2013.01); *G06T 2207/30232* (2013.01)

(56) References Cited

U.S. PATENT DOCUMENTS

| | | | | |
|---|---|---|---|---|
| 2010/0328460 A1* | 12/2010 | Merkel | .............. | G06K 9/00771 |
| | | | | 348/143 |
| 2011/0096922 A1* | 4/2011 | Oya | ........................ | H04N 7/183 |
| | | | | 380/28 |
| 2012/0038766 A1* | 2/2012 | Park | .................. | G08B 13/19652 |
| | | | | 348/143 |
| 2013/0004090 A1* | 1/2013 | Kundu | .................. | G07F 19/207 |
| | | | | 382/232 |
| 2014/0160282 A1* | 6/2014 | Yamagi | .................... | H04N 7/18 |
| | | | | 348/143 |
| 2014/0368646 A1* | 12/2014 | Traff | ........................ | H04N 5/33 |
| | | | | 348/143 |
| 2016/0155465 A1* | 6/2016 | Park | ...................... | G11B 20/005 |
| | | | | 386/241 |
| 2016/0188887 A1* | 6/2016 | Ghafourifar | .......... | G06F 21/602 |
| | | | | 713/189 |

FOREIGN PATENT DOCUMENTS

JP            5159381            12/2012
JP            2013-186838      9/2013

\* cited by examiner

US 10,535,143 B2

MONITORING DEVICE AND MONITORING METHOD

TECHNICAL FIELD

The present disclosure relates to a monitoring device and a monitoring method that generates and outputs an output video on which a masking process, which changes image regions of moving bodies detected from video of a monitoring area into a masking image, is implemented.

BACKGROUND ART

A monitoring system, which photographs a work floor, on which various work such as warehousing, sorting, and shipping are performed, by using a camera, and monitors the status of the work floor by using the images of the camera, is adopted in distribution centers, but there is a demand for a capability of checking the transport status of a package on the work floor in video of the camera, and when images are used with such an aim, unlike a case in which images are used with the aim of monitoring for crime prevention and disaster prevention, it is desirable that the privacy of people such as employees present on the work floor be protected.

In response to the demand to protect the privacy of such people, techniques for performing a masking process (a concealment process), which changes people regions in video photographed by a camera to a specific masking image, are known in the related art (refer to PTL 1 and PTL 2). In these techniques, a masking process is performed for image regions of moving bodies by detecting moving bodies by using a background differential system that extracts a foreground image through comparison with a background image.

CITATION LIST

Patent Literature

PTL 1: Japanese Patent Unexamined Publication No. 2013-186838
PTL 2: Japanese Patent No. 5159381

SUMMARY OF THE INVENTION

A monitoring device of the present disclosure generating and outputting an output video on which a masking process, which changes an image region of a moving object detected from video of a monitoring area into a masking image, is implemented includes a masking invalid region setter that sets a masking invalid region in video of a monitoring area in accordance with a manipulation input of a user, a moving object detection portion that detects a moving object from the video of the monitoring area and acquires region information for each moving object, a process target selector that selects whether or not to set an image region of a moving object detected by the moving object detector as a target of the masking process in accordance with whether or not the image region is positioned in the masking invalid region, and a video output controller that generates and outputs an output video in which the masking process is implemented only on an image region of a moving object set as a target of the masking process by the process target selector.

In addition, a monitoring method of the present disclosure causes an information processing device to perform a process of generating and outputting an output video on which a masking process, which changes an image region of a moving object detected from video of a monitoring area into a masking image, is implemented includes a step of setting a masking invalid region in video of the monitoring area in accordance with a manipulation input of a user, a step of detecting a moving object from the video of the monitoring area and acquiring region information for each moving object, a step of selecting whether or not to set an image region of a moving object detected in the step of detecting as a target of the masking process in accordance with whether or not the image region is positioned in the masking invalid region, and a step of generating and outputting an output video in which the masking process is implemented only on an image region of a moving object set as a target of the masking process.

According to the present disclosure, a masking process is implemented on image regions of moving bodies positioned in a masking invalid region, and the masking process is not implemented on image regions of moving bodies positioned in a region (a masking valid region) other than the masking invalid region. Therefore, by setting a masking invalid region to be a region in which an object corresponding to a monitoring target is present, a state in which the masking process is implemented in an image region of a person and the masking process is not implemented in an image region of an object corresponding to a monitoring target is attained, and it is possible to suitably check the status of the object corresponding to a monitoring target while achieving protection of the privacy of people.

DESCRIPTION OF EMBODIMENTS

Figure 1:
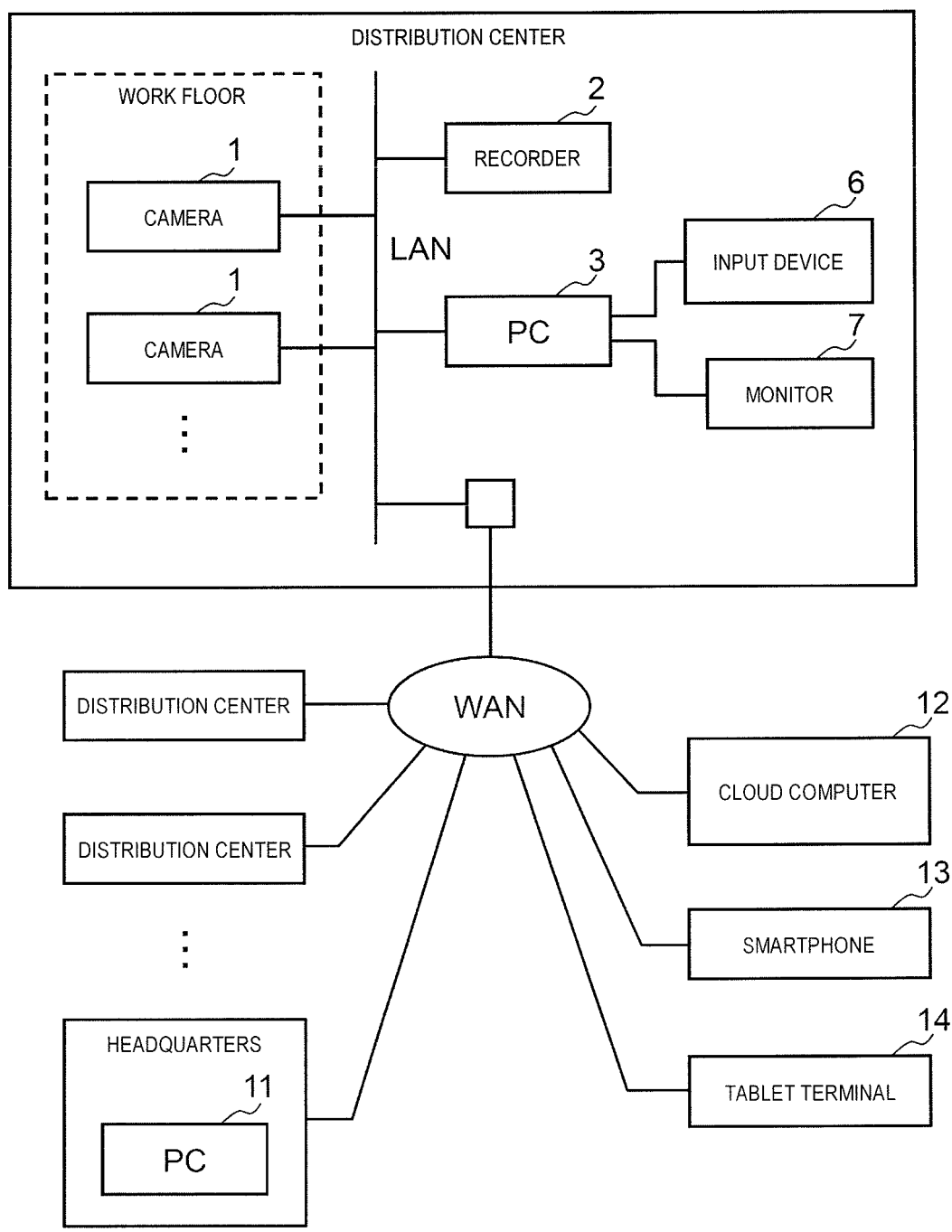
FIG. 1 is an overall configuration view of a monitoring system according to a first exemplary embodiment.

Problems of the related art will be described briefly prior to the description of the exemplary embodiments. Meanwhile, in the above-mentioned manner, there is a demand for a capability of checking the transport status of a package on a work floor in video of a camera in a distribution center, and in this case, a package is a target for monitoring. However, in the manner of the related art, as a result of a transported package being detected as a moving object in a simple masking process based on a background differential system, a state in which a masking process is carried out for both people and packages is attained, and there is a problem in that it is not possible to suitably check the transport status of a package.

In such an instance, an object of the present disclosure is to provide a monitoring device and a monitoring method in which it is possible to suitably check the status of the object corresponding to a monitoring target while achieving protection of the privacy of people in a case in which an object that moves in a similar manner to a person is set as a target for monitoring.

A first disclosure for solving the above-mentioned problem is a monitoring device generating and outputting an output video on which a masking process, which changes an image region of a moving object detected from video of a monitoring area into a masking image, is implemented, and has a configuration that includes a masking invalid region setter that sets a masking invalid region in video of a monitoring area in accordance with a manipulation input of a user, a moving object detection portion that detects a moving object from the video of the monitoring area and acquires region information for each moving object, a process target selector that selects whether or not to set an image region of a moving object detected by the moving object detector as a target of the masking process in accordance with whether or not the image region is positioned in the masking invalid region, and a video output controller that generates and outputs an output video in which the masking process is implemented only on an image region of a moving object set as a target of the masking process by the process target selector.

According to this configuration, a masking process is implemented on image regions of moving bodies positioned in a masking invalid region, and the masking process is not implemented on image regions of moving bodies positioned in a region (a masking valid region) other than the masking invalid region. Therefore, by setting a masking invalid region to be a region in which an object corresponding to a monitoring target is present, a state in which the masking process is implemented in a image region of a person and the masking process is not implemented in an image region of an object corresponding to a monitoring target is attained, and it is possible to suitably check the status of the object corresponding to a monitoring target while achieving protection of the privacy of people.

In addition, a second disclosure has a configuration that further includes a movement pattern setter that sets a movement pattern of a predetermined moving object in accordance with a manipulation input of a user, in which the process target selector selects whether or not to set an image region of a moving object positioned in the mask invalid region as a target of the masking process in accordance with whether or not the moving object and the movement pattern conform with one another.

According to this configuration, since an object corresponding to a monitoring target conforms with a movement pattern set in advance, an image region of the moving object is not set as a target of the masking process, and therefore, it is possible to avoid a circumstance in which the masking process is performed on the object corresponding to a monitoring target. Further, since it is not likely that a person will perform a movement that conforms with the movement pattern, an image region of a person is set as a target of the masking process, and therefore, it is possible to avoid the inconvenience of the image region of a person positioned in the masking invalid region being displayed in a state in which the masking process has not been performed.

In addition, a third disclosure has a configuration in which the movement pattern is stipulated by using at least one of a movement speed and a movement direction of a moving object.

According to this configuration, it is possible to perform a process that selects whether or not an image region of a moving object is set as a target of the masking process with high accuracy.

In addition, a fourth disclosure has a configuration in which, when a fixed image that represents a predetermined moving object is detected in an image region of a moving object positioned in the masking invalid region, the process target selector does not set the image region of the moving object as a target of the masking process.

According to this configuration, since an image region of an object corresponding to a monitoring target is not set as a target of the masking process due to the detection of a fixed image, it is possible to avoid a circumstance in which the masking process is performed on the object corresponding to a monitoring target. Further, since a fixed image is not detected in an image region of a person, an image region of a person is set as a target of the masking process, and therefore, it is possible to avoid the inconvenience of the image region of a person positioned in the masking invalid region being displayed in a state in which the masking process has not been performed.

In addition, a fifth disclosure has a configuration that further includes a moving object tracking portion that tracks a moving object detected by the moving object detector, in which, in a case in which a moving object positioned in the masking invalid region enters the masking invalid region after appearing in a region other than the masking invalid region, the process target selector continuously sets an image region of the moving object as the target of the masking process.

According to this configuration, since it is likely that a moving object that appears in a region other than the masking invalid region (a masking valid region) and enters the masking invalid region is a person, by setting the image region of such a moving object as a target of the masking process, it is possible to avoid the inconvenience of the image region of a person positioned in the masking invalid region being displayed in a state in which the masking process has not been performed.

In addition, a sixth disclosure has a configuration that further includes a person determination portion that determines whether or not a moving object detected by the moving object detector is a person, in which the moving object tracking portion tracks a moving object determined to be a person by the person determination portion.

According to this configuration, since only a moving object that is a person is set as a target of the masking process, it is possible to avoid a circumstance in which the masking process is unnecessarily performed on an image region of a moving object that is not a person.

In addition, a seventh disclosure is a monitoring method causing an information processing device to perform a process that generates and outputs an output video on which a masking process, which changes an image region of a moving object detected from video of a monitoring area into a masking image, is implemented, and has a configuration that includes a step of setting a masking invalid region in video of the monitoring area in accordance with a manipulation input of a user, a step of detecting a moving object from the video of the monitoring area and acquiring region information for each moving object, a step of selecting whether or not to set an image region of a moving object detected in the step of detecting as a target of the masking process in accordance with whether or not the image region is positioned in the masking invalid region, and a step of generating and outputting an output video in which the masking process is implemented only on an image region of a moving object set as a target of the masking process.

According to this configuration, in a similar manner to the first disclosure, in a case in which an object that moves in a similar manner to a person is set as a target for monitoring, it is possible to suitably check the status of the object corresponding to a monitoring target while achieving protection of the privacy of people.

Hereinafter, exemplary embodiments will be described with reference to the drawings.

First Exemplary Embodiment

FIG. 1 is an overall configuration view of a monitoring system according to a first exemplary embodiment. The monitoring system is designed with a distribution center, or the like, as the target thereof, and is provided with camera (a monitoring device) 1, recorder (a video accumulation device) 2, and PC (an inspection device) 3.

Camera 1 is installed in a suitable location of the work floor of a distribution center (a facility), and video of the work floor (monitoring area) is imaged by camera 1. Camera 1 is a so-called IP camera in which network connection is possible, recorder 2 is also configured so that network connection is possible, camera 1 and recorder 2 are connected to a LAN installed in the distribution center, and video output from camera 1 is accumulated in recorder 2.

In addition, PC 3 is also connected to the LAN, video output from camera 1 and recorder 2 is input to PC 3, and video is displayed on monitor (a display device) 7 connected to PC 3. As a result of this, a user such as an administrator of the distribution center can inspect video of the work floor, which is photographed by camera 1, in real time, and, in addition, can inspect past video recorded on recorder 2.

In addition, camera 1, recorder 2, and PC 3 are respectively installed in a plurality of distribution centers, PC 11 is installed at a headquarters that unifies the plurality of distribution centers, and PC 11 is connected to camera 1 and recorder 2 of each distribution center via a WAN. As a result of this, a user at the headquarters to inspect video of work floors, which are photographed by the cameras 1, in real time, and, in addition, to inspect past video recorded on the recorders 2.

Next, a summary of a process performed by camera 1 shown in FIG. 1 will be described. FIGS. 2A, 2B, 3A, 3B, 4A, and 4B are explanatory views that describe a process performed by camera 1.

Figure 2A:
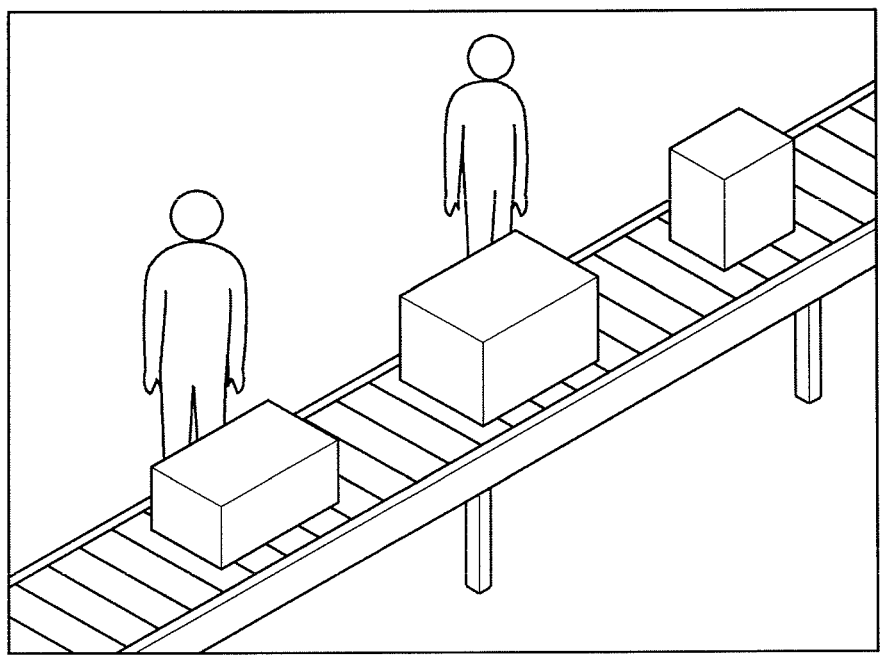
FIG. 2A is an explanatory view that describes a process performed by camera 1.

In camera 1, a work floor, which corresponds to a monitoring area of a distribution center, is photographed, and video shown in FIG. 2A is obtained. In this video, a status in which packages are transported by a conveyor (a transport device) installed on the work floor is seen, and people (workers) that perform work such as sorting and checking of the transport status are seen in the vicinity thereof.

In the present exemplary embodiment, a process that detects moving bodies from the video of the monitoring area shown in FIG. 2A is performed, and a masking process; that is, a process that changes (substitutes) image regions of moving bodies into masking images, is implemented on moving bodies detected by the moving object detection process.

Figure 2B:
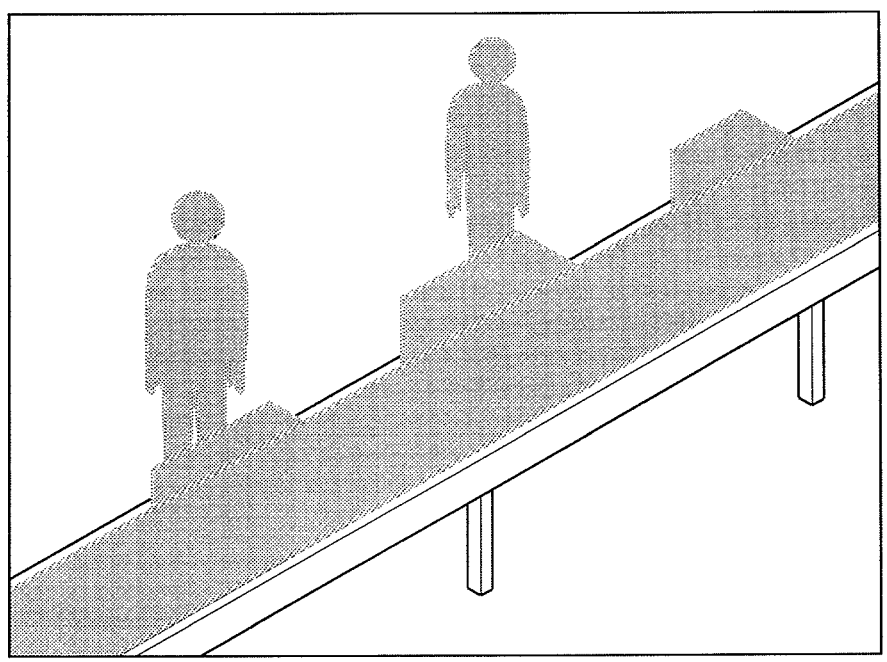
FIG. 2B is an explanatory view that describes a process performed by camera 1.

At this time, in a moving object detection process, since the conveyor and packages transported thereon are detected as moving bodies, if all of the moving bodies detected from the video of the monitoring area are set as targets and the masking process implemented, as shown in FIG. 2B, a state in which the masking process is carried out on the packages and the conveyor in addition to the people is attained, and there is a problem in that although it is possible to protect the privacy of the people, it is not possible to suitably check the transport statuses of the packages.

Figure 3A:
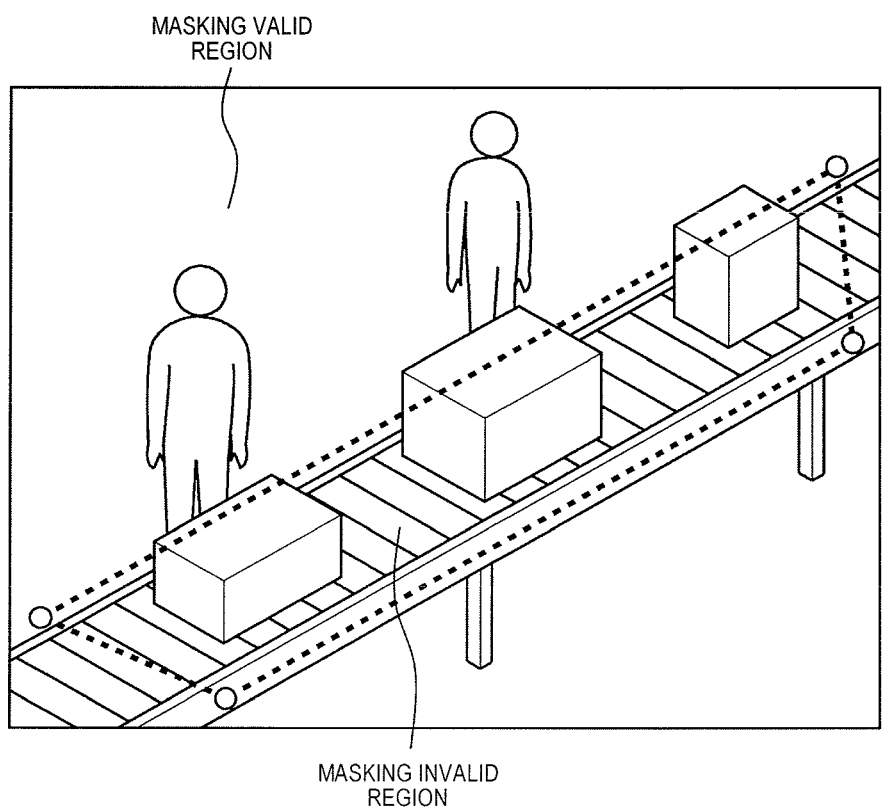
FIG. 3A is an explanatory view that describes a process performed by camera 1.

In such an instance, in the present exemplary embodiment, as shown in FIG. 3A, a masking invalid region, in which the masking process is invalid, is set to be an image region of the packages and the conveyor, image regions of moving bodies positioned in the masking invalid region are not set as targets of the masking process, and image regions of moving bodies positioned in regions other than (masking valid regions) the masking invalid region are set as targets of the masking process.

Figure 3B:
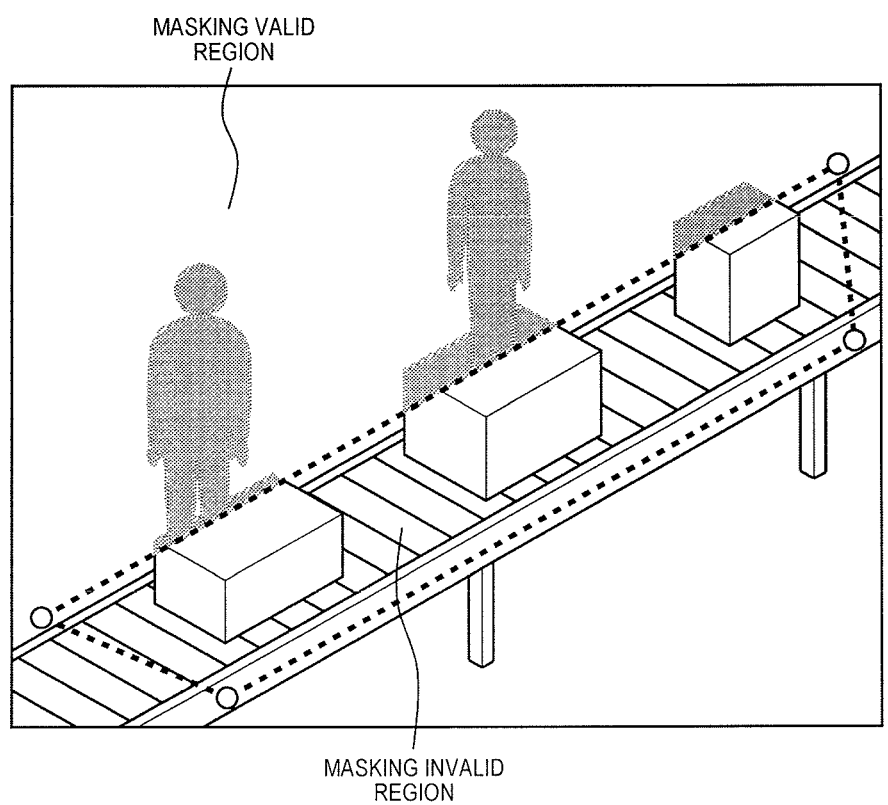
FIG. 3B is an explanatory view that describes a process performed by camera 1.

As a result of this, as shown in FIG. 3B, a state in which the masking process is carried out on moving bodies positioned in the masking valid region; that is, people, and the masking process is not carried out on moving bodies positioned in the masking invalid region; that is, the packages and the conveyor, is attained, and it is possible to suitably check the transport status of the packages.

Additionally, in the example shown in FIGS. 3A and 3B, since the masking invalid region is set so that a boundary line of the masking invalid region crosses the image regions of the packages, the masking process is carried out on portions of the image regions of the packages, which protrude from the masking invalid region. In this manner, the reason for setting the masking invalid region to be narrow is so that the protection of the privacy of the people is relatively achieved by reducing omission of the masking process on the people as much as possible since it is not a problem if the masking process is carried out to a certain degree on the packages. In addition, in a case in which it is desirable to avoid a circumstance in which the masking process is carried out on portions of the image regions of the packages, the masking invalid region may be set to be wide so as to surround all of the image regions through which the packages pass.

Figure 4A:
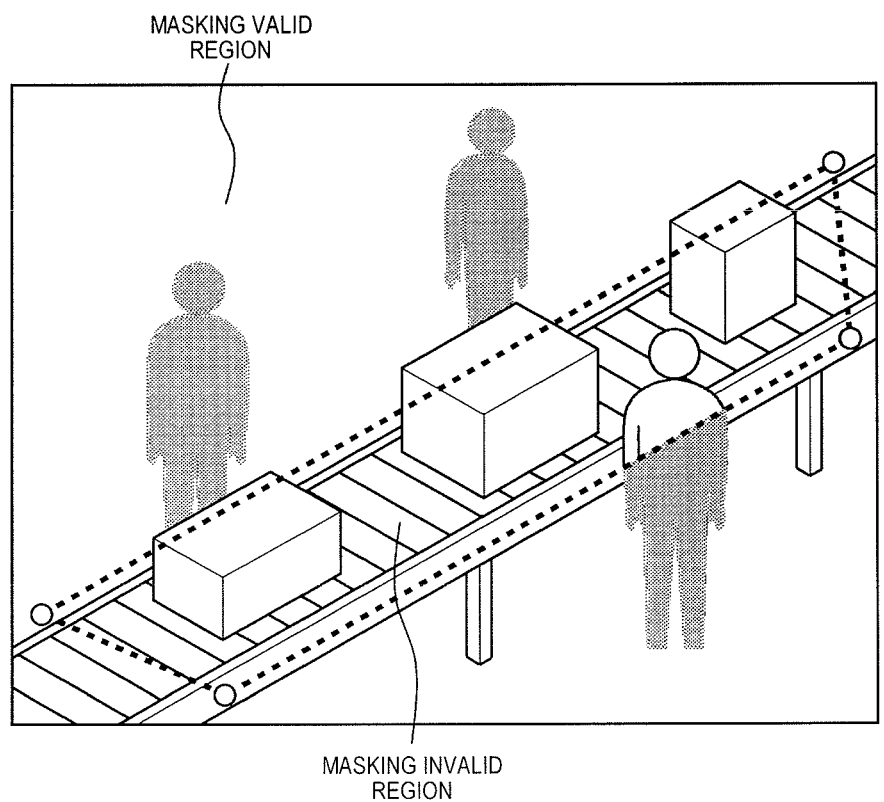
FIG. 4A is an explanatory view that describes a process performed by camera 1.

In this manner, if image regions of moving bodies, which are set as targets of the masking process are selected by using a condition of presence or absence in the masking invalid region, it is possible to suitably check the transport statuses of the packages while achieving protection of the privacy of the people, but when a person approaches the conveyor and enters the masking invalid region; that is, when a portion of an image region of a person attains a state of overlapping with the masking invalid region as shown in FIG. 4A, the masking process is carried out only on portions of the image regions of people positioned in the masking valid region, the masking process is not carried out on a portion of an image region of the person positioned in the masking invalid region, and therefore, it is not possible to relatively achieve protection of the privacy of the people.

In such an instance, in the present exemplary embodiment, focusing on the fact that the packages and the conveyor follow a constant movement pattern (movement speed, movement direction, and the like), the movement pattern of the packages and the conveyor is set, and a process in which the image regions of moving bodies positioned in the masking invalid region are not set as targets of the masking process in a case in which the moving bodies conform with the set movement pattern, and the image regions of the moving bodies are set as targets of the masking process in a case in which the moving bodies do not conform with the set movement pattern.

Figure 4B:
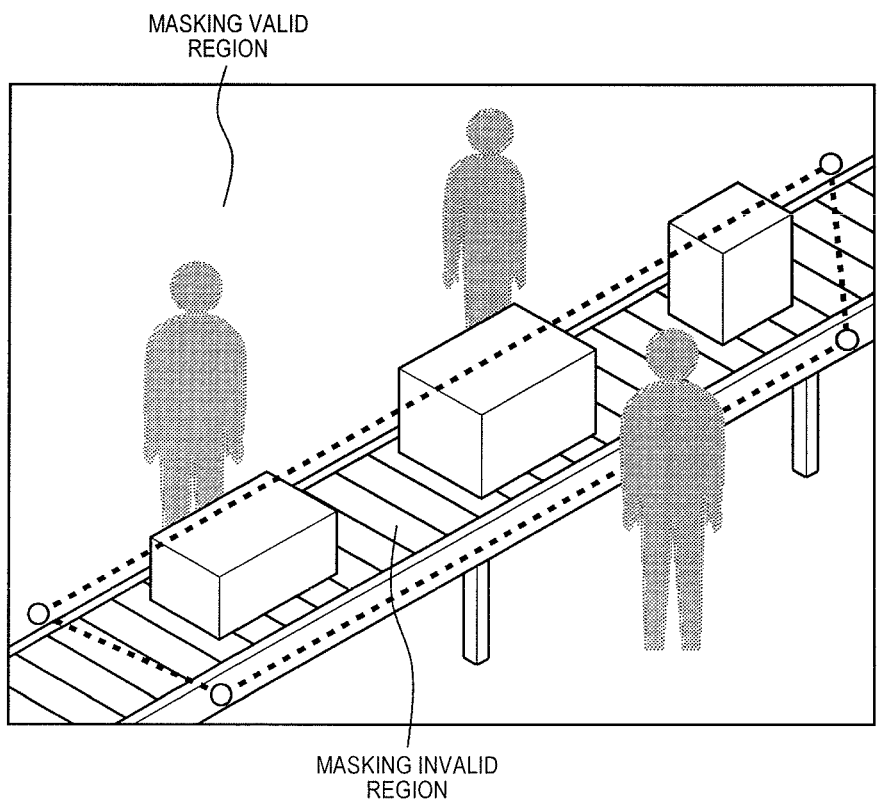
FIG. 4B is an explanatory view that describes a process performed by camera 1.

As a result of this, as shown in FIG. 4B, a state in which the masking process is also carried out on image regions of people positioned in the masking invalid region; that is, in which the masking process is carried out on all of the image regions of the people, is attained, and since it is possible to avoid omission of the masking process on the people, and therefore, it is possible to relatively achieve protection of the privacy of the people. Conversely, a state in which the masking process is not carried out in the image regions (a state in which separation from the image regions of the people is possible) of the packages that conform to the set movement pattern is attained, and therefore, it is possible to check the transport status of the packages.

Figure 5:
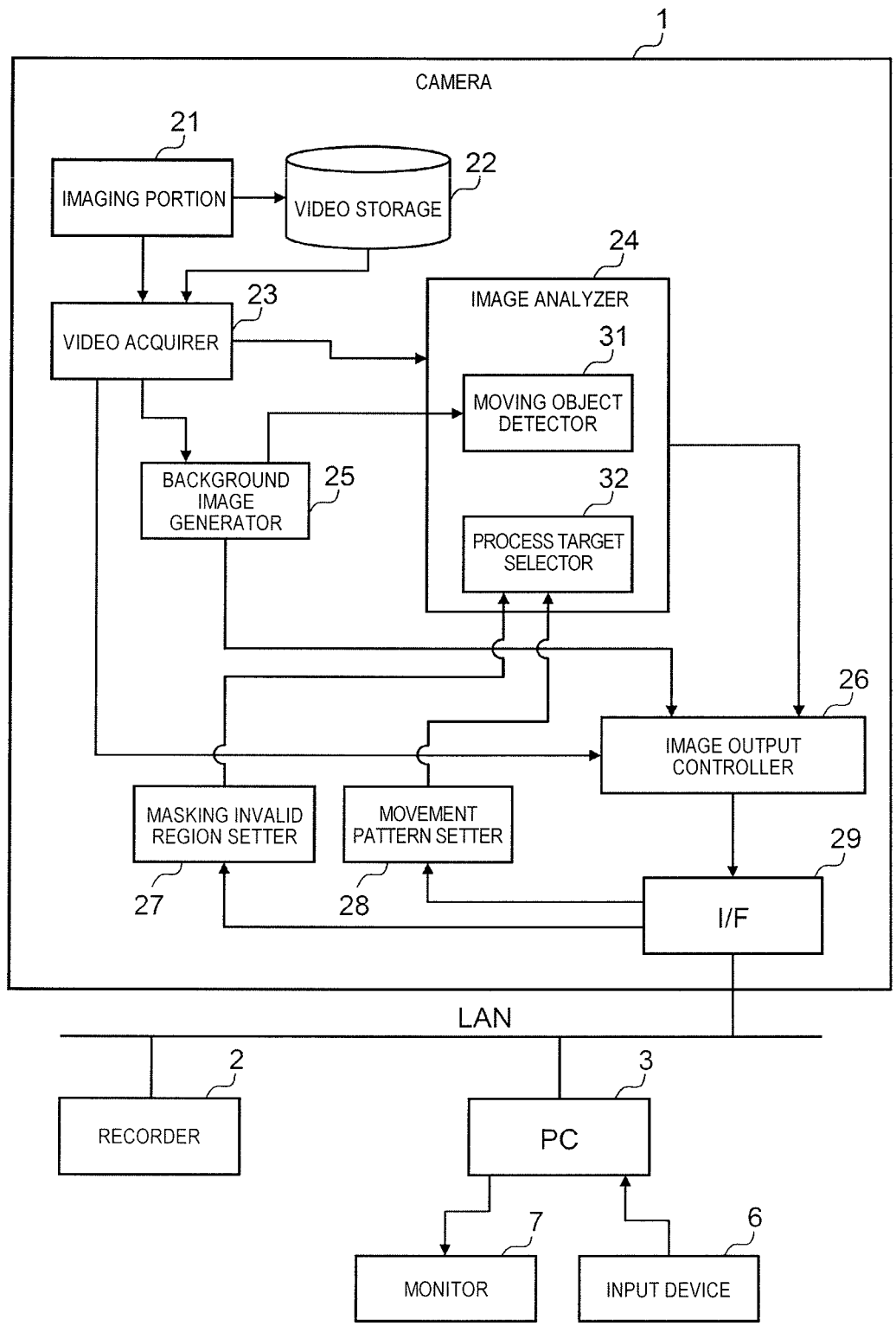
FIG. 5 is a functional block diagram that shows a schematic configuration of camera 1.

Next, a schematic configuration of camera 1 shown in FIG. 1 will be described. FIG. 5 is a functional block diagram that shows a schematic configuration of camera 1.

Camera 1 is provided with imaging portion 21, video storage 22, video acquirer 23, image analyzer 24, background image generator 25, video output controller 26, masking invalid region setter 27, movement pattern setter 28, and interface 29.

Imaging portion 21 is configured by an imaging element, a control circuit thereof, and the like, and outputs video in which video of the monitoring area is imaged. The video output from imaging portion 21 is accumulated in video storage 22.

Video storage 22 is composed of a storage device such as a memory card, hard disk drive or a solid state drive. Since video storage 22 is built into camera 1, a storage device having a comparatively small capacity is adopted, and the most recent video is accumulated in a range of the storage capacity.

In video acquirer 23, video of the monitoring area imaged by imaging portion 21 is acquired from imaging portion 21 or video storage 22. In this instance, video is acquired from imaging portion 21 in a case in which current video is displayed in real time, and video is acquired from video storage 22 in a case in which past video is displayed.

A process that sets a masking invalid region in video of the monitoring area in accordance with a manipulation input of a user performed by using PC 3 is performed in masking invalid region setter 27. In this process, a process in which a masking invalid region settings screen (refer to FIG. 7), on which video of the monitoring area is displayed, is displayed on monitor 4 connected to PC 3, input information that depends on a manipulation input of a user performed using input device 6 is acquired from PC 3 via a network, and a masking invalid region is set on the basis of the input information is performed.

A process that sets a movement pattern of an object (a package in the present exemplary embodiment) corresponding to a monitoring target in accordance with the manipulation input of the user performed by using PC 3 is performed in movement pattern setter 28. In this process, a process in which a movement pattern setting screen (refer to FIG. 7), on which video of the monitoring area is displayed, is displayed on monitor 4, input information that depends on a manipulation input of the user performed using input device 6 is acquired from PC 3 via the network, and a movement pattern is set on the basis of the input information is performed.

A process in which a background image, in which images (foreground images) of moving bodies have been removed from the video, is generated is performed in background image generator 25. In this process, a background image is generated from a plurality of items of video (frames) in a most recent predetermined learning period, and the background image is sequentially updated in accordance with the acquisition of new video (frames). A publicly-known technique may be used in the process performed by background image generator 25. Additionally, it is preferable that the background image be sequentially updated in the above-mentioned manner, video from a point at which moving bodies such as people and packages are not present, for example, video from prior to the start of work may be saved on PC 3 in advance as the background image.

Image analyzer 24 is a component that analyzes video of the monitoring area acquired from imaging portion 21 or video storage 22 via video acquirer 23, acquires information relating to moving bodies represented in the video, and is provided with moving object detector 31 and process target selector 32.

A process that detects moving bodies from video of the monitoring area and acquires region information (position information relating to an image region) for each moving object is performed in moving object detector 31. The process is performed on the basis of a background image generated by background image generator 25, and image regions of moving bodies are specified from a difference between video at a time of interest (the current time in a real time process) and the background image acquired in a learning period prior to the time of interest. Additionally, the process performed by moving object detector 31 may use a publicly-known image recognition technique.

Additionally, a so-called "background model" is included in the background image in the present exemplary embodiment, the background model is constructed from a plurality of images during the learning period in background image generator 25, the image regions of moving bodies (foreground regions) and a background region are divided by comparing the video at the time of interest and the background model in moving object detector 31, and position information of the image regions of moving bodies is acquired.

A process that selects whether or not to set the image regions of moving bodies detected by moving object detector 31 as targets of the masking process is performed in process target selector 32. In the present exemplary embodiment, a process that selects whether or not set the image regions of the moving bodies detected by moving object detector 31 as targets of the masking process in accordance with whether or not the image regions are positioned in the masking invalid region set by masking invalid region setter 27; that is, a process in which image regions of moving bodies positioned in the masking invalid region are not set as targets of the masking process and image regions of moving bodies positioned in regions (masking valid regions) other than the masking invalid region are set as targets of the masking process, is performed.

Furthermore, a process that selects whether or not to set the image regions of the moving bodies positioned in the masking invalid region as targets of the masking process in accordance with whether or not moving bodies thereof conform with the movement pattern set by movement pattern setter 28; that is, a process in which the image regions of moving bodies are not set as targets of the masking process in a case in which the moving bodies present in the masking invalid region conform with the movement pattern and the image regions of moving bodies are set as targets of the masking process in a case in which the moving bodies present in the masking invalid region do not conform with the movement pattern, is performed in process target selector 32. As a result of this, even if an image region of a moving object changes to a status of stretching across both the masking invalid region and the masking valid region, it is possible to continue a selection result of whether or not to set as a target of the masking process.

A process that generates and outputs an output video in which the masking process, which changes image regions of moving bodies into masking images on the basis of position information of the image regions of moving bodies acquired by moving object detector 31 and process target selection information acquired by process target selector 32, is implemented, is performed in video output controller 26.

In video output controller 26, firstly, a process that generates masking images, which have outlines corresponding to the image regions of moving bodies set as targets of the masking process, on the basis of position information and process target selection information of the image regions of moving bodies is performed. In the process, information relating to the outlines of the image regions of the moving bodies is generated from the position information of the image regions of the moving bodies, and masking images in which inner portions of the outlines are filled with a predetermined color (for example, blue), are generated on the basis of the information relating to the outlines. Subsequently, a process that superimposes the masking images onto the background image generated by background image generator 25 and generates masking process video is performed. Additionally, the masking images may be superimposed onto the background image in a transmissive state, and in this case, a state in which the background image can be seen through the masking images in the masking process video is attained.

In addition, a process that cuts out the image regions of the moving bodies that are not set as targets of the masking process from video of the monitoring area output from video acquirer 23 on the basis of the position information and the process target selection information of the image regions of the moving bodies, and superimposes the images of the moving bodies onto the background image is performed in video output controller 26.

Interface 29 is a component that performs communication of information between PC 3, recorder 2, and the like, via a LAN, the masking process video output from video output controller 26 is transmitted to PC 3 via interface 29 and it is possible to inspect the masking process video by using PC 3, and in addition, the masking process video output from video output controller 26 is transmitted to recorder 2 via interface 29 and the masking process video is accumulated in recorder 2.

Figure 6:
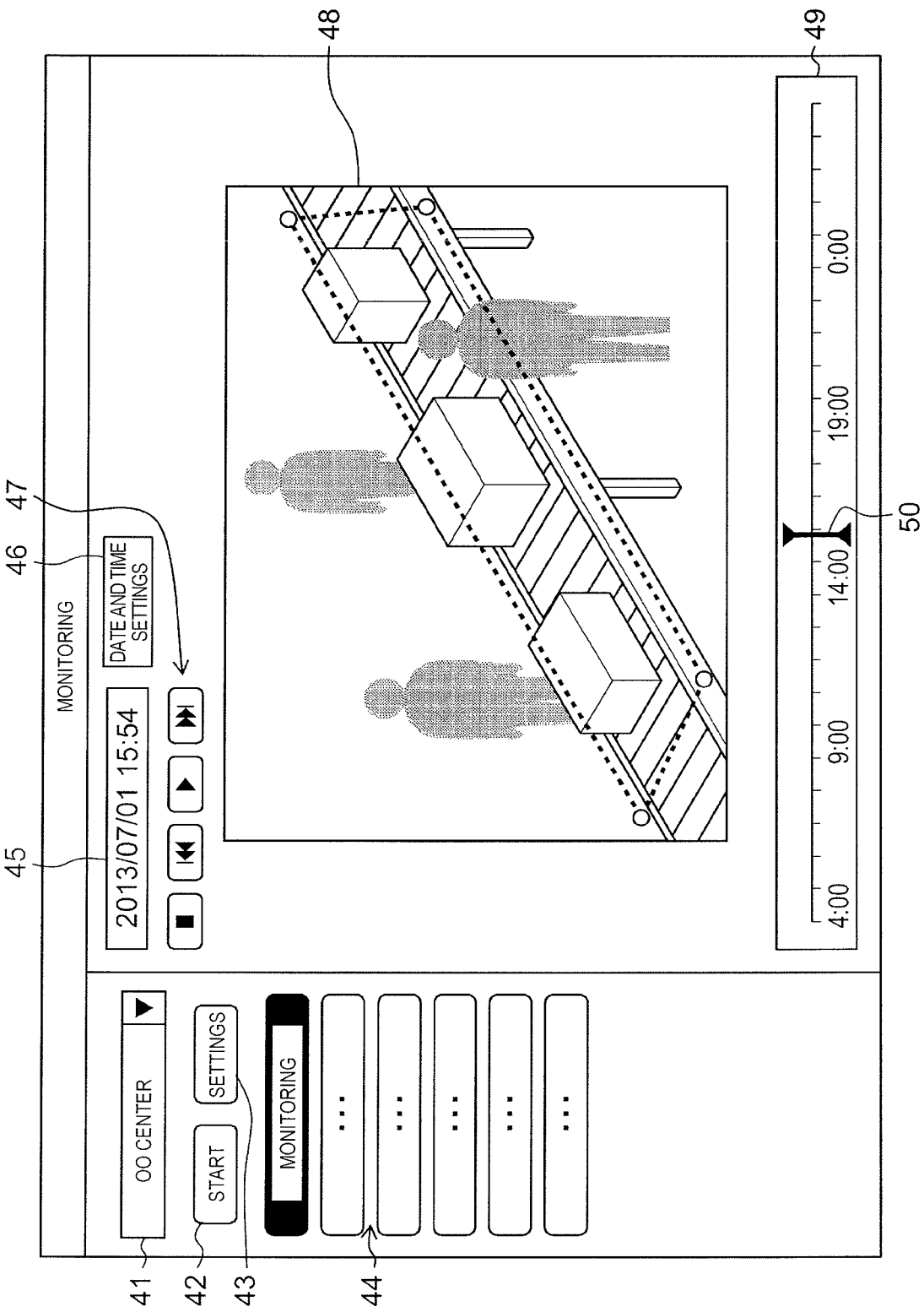
FIG. 6 is an explanatory view that shows a monitoring screen displayed on monitor 4.

Next, a monitoring screen for checking the transport status of the packages, which are monitoring targets, will be described. FIG. 6 is an explanatory view that shows a monitoring screen displayed on monitor 4.

The monitoring screen is a screen that a user inspects in order to check the transport status of the packages by the conveyor on the work floor, which corresponds to the monitoring area in a distribution center, and facility selection portion 41, start button 42, settings button 43, operation mode selection portion 44, date and time display portion 45, date and time setting button 46, playback manipulation portion 47, video display portion 48, and display time manipulation portion 49 are provided on the monitoring screen.

In facility selection portion 41, a user selects a facility (a distribution center) by using a pull-down menu. Start button 42 is a button that starts a monitoring process by using camera 1. Settings button 43 is a button that sets various conditions in the monitoring process, and in the present exemplary embodiment, a menu screen (not illustrated in the drawings) is displayed as a pop-up as a result of manipulating settings button 43, and when a menu of masking invalid region settings or movement pattern settings is selected on the menu screen, the masking invalid region settings screen (refer to FIG. 7) or a movement pattern settings screen (refer to FIGS. 8A and 8B) is displayed. Operation mode selection portion 44 is a portion in which an operation mode is selected, various operation modes are prepared, and the monitoring screen shown in FIG. 6 is displayed as a result of selecting monitoring.

Date and time display portion 45 is a portion in which the date and time are displayed and date and time setting button 46 is a button for setting the date and time, a date and time settings screen, which is not illustrated in the drawings, is displayed when date and time setting button 46 is manipulated, a selected date and time is displayed in date and time display portion 45 as a result of selecting a date and time on the date and time settings screen, and in addition, video of the selected date and time is displayed in video display portion 48.

Output video (a moving image) generated by video output controller 26 is displayed in video display portion 48. In the example shown in FIG. 6, a status in which packages are transported by a conveyor installed on a work floor, which corresponds to a monitoring area, is seen in the video, people (workers) that perform work such as sorting and checking of the transport statuses of the packages are seen in the vicinity of the packages, and the masking process is carried out on the people but the masking process is not carried out on the packages and the conveyor. In addition, the masking invalid region is displayed in video display portion 48 in the image regions of the packages and the conveyor.

Additionally, a masking mode that displays masking process video on which the masking process has been carried out on the people as shown in FIG. 6, and a masking cancellation mode that displays unprocessed video output from imaging portion 21 without change may be prepared, and a user may select a mode as appropriate. In this case, it is possible to achieve protection of the privacy of the people if the masking mode is set as an initial state and it is set so that selection of the masking cancellation mode is allowed only in a case of a user that has the authorization to inspect unprocessed video by using user authentication.

Playback manipulation portion 47 is a portion for performing manipulation related to the playback of video displayed on video display portion 48, various manipulation buttons of normal playback, fast forward playback, rewind playback, and stop are provided, and it is possible to efficiently inspect video spanning a long period of time by manipulating the manipulation buttons.

Display time manipulation portion 49 is a portion for adjusting the display time of the video displayed on video display portion 48, and it is possible to switch to video of a desired time by manipulating display time manipulation portion 49. More specifically, when a slider 50 is shifted using input device 6 such as a mouse, video of a time indicated by the slider 50 is displayed on video display portion 48. As a result of this, it is possible to check the status of a work area at a required time by using the video of video display portion 48.

Additionally, on the monitoring screen, there is a live screen that displays video imaged by imaging portion 21 on video display portion 48 in real time, and a recorded screen that plays back video accumulated in video storage 22, and playback manipulation portion 47 is used on the recorded screen but cannot be manipulated on the live screen. In addition, in display time manipulation portion 49, it is possible to switch to the recorded screen by adjusting the display time of video on the live screen so as to go back to the past.

Figure 7:
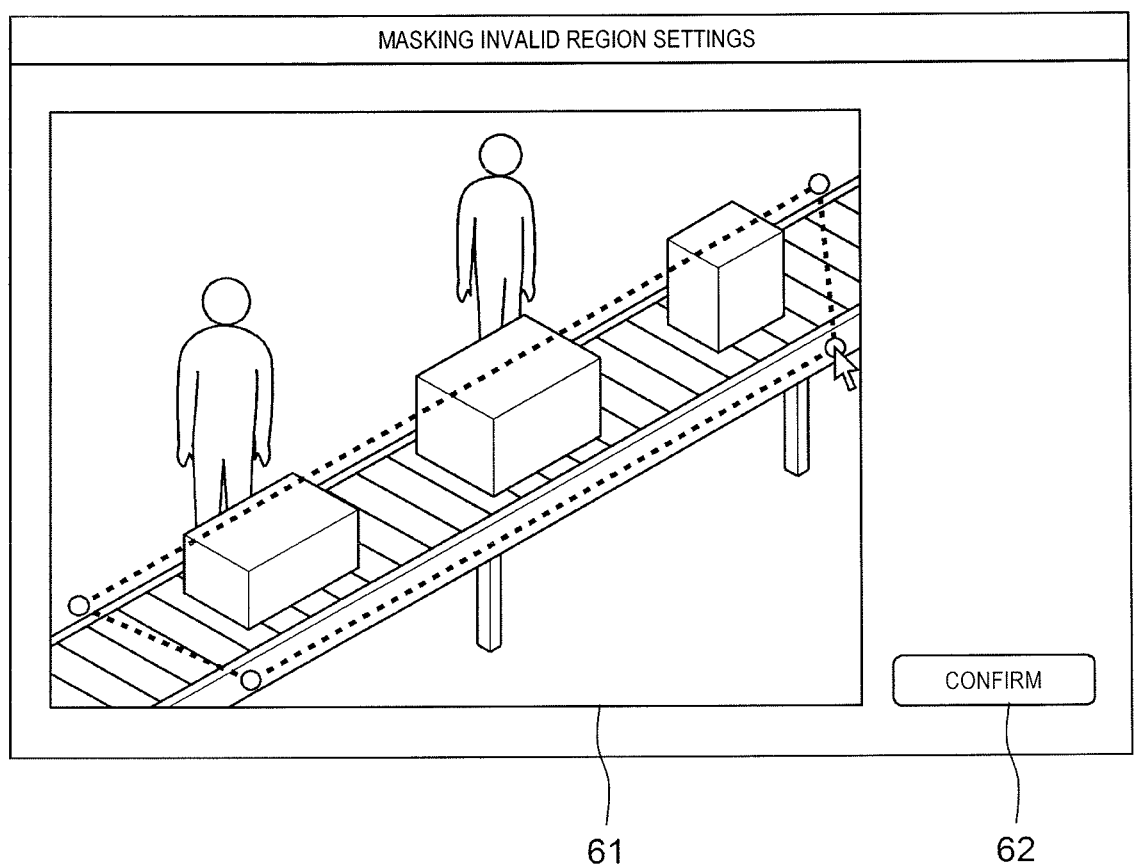
FIG. 7 is an explanatory view that shows a masking invalid region settings screen displayed on monitor 4.

Next, manipulation for setting the masking invalid region will be described. FIG. 7 is an explanatory view that shows a masking invalid region settings screen displayed on monitor 4.

The masking invalid region settings screen is a screen on which a user designates the masking invalid region, in which the masking process is not implemented, in video of the monitoring area, and a video display portion 61, and a confirm button 62 are provided on the masking invalid region settings screen. Video of the monitoring area is displayed in the video display portion 61, and it is possible to designate the masking invalid region in the video displayed on the video display portion 61 using input device 6 such as a mouse. When the masking invalid region is designated and the confirm button 62 is manipulated in the video display portion 61, a process for setting the masking invalid region by using the designated content is performed by masking invalid region setter 27.

In the present exemplary embodiment, since the packages are the monitoring targets, the masking invalid region is designated to the image regions of the conveyor and the packages in order to avoid a circumstance in which the masking process is carried out on the packages.

More specifically, a user performs a manipulation (for example, a click manipulation of a mouse) that inputs a plurality of points that stipulate the masking invalid region using input device 6 such as a mouse, and the masking invalid region is designated so as to link the points input in such an instance. In the example shown in FIG. 7, the masking invalid region is set to be a tetrahedron and four top points of the masking invalid region are designated, but the shape of the masking invalid region is not limited to this configuration, and may be a polygon other than a tetrahedron, a circle, or the like.

Figure 8A:
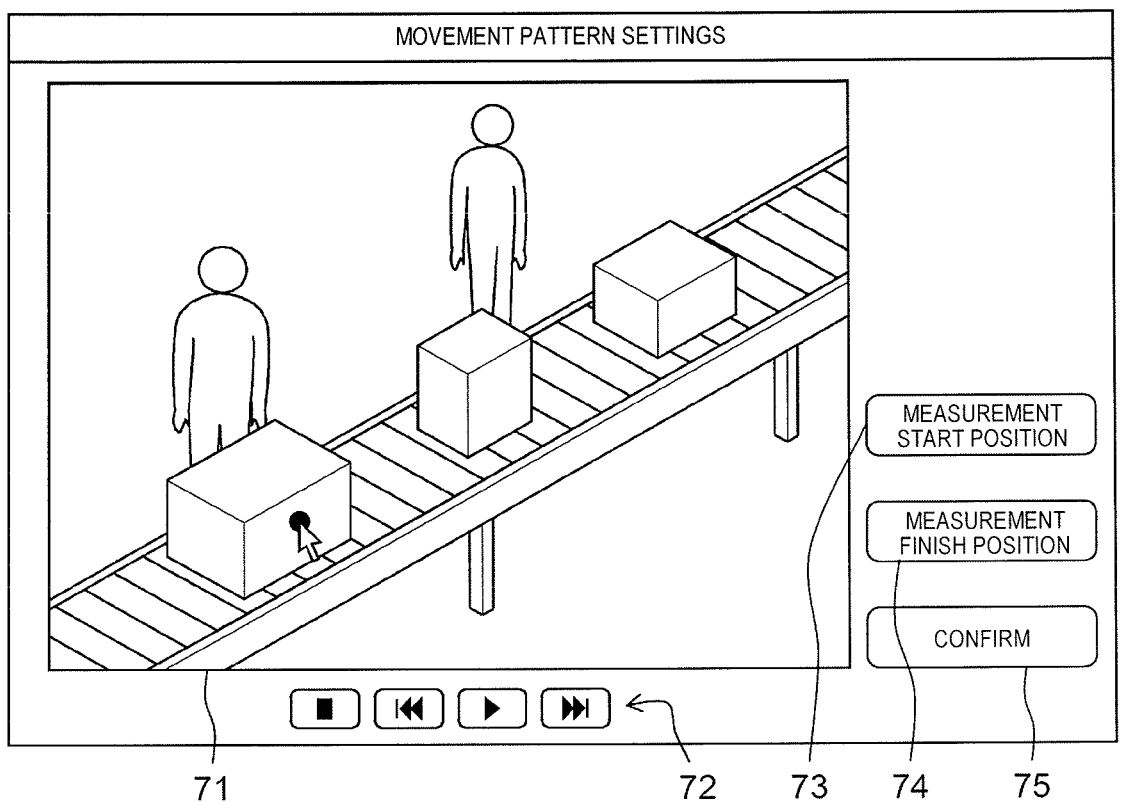
FIG. 8A is an explanatory view that shows a movement pattern settings screen displayed on monitor 4.
Figure 8B:
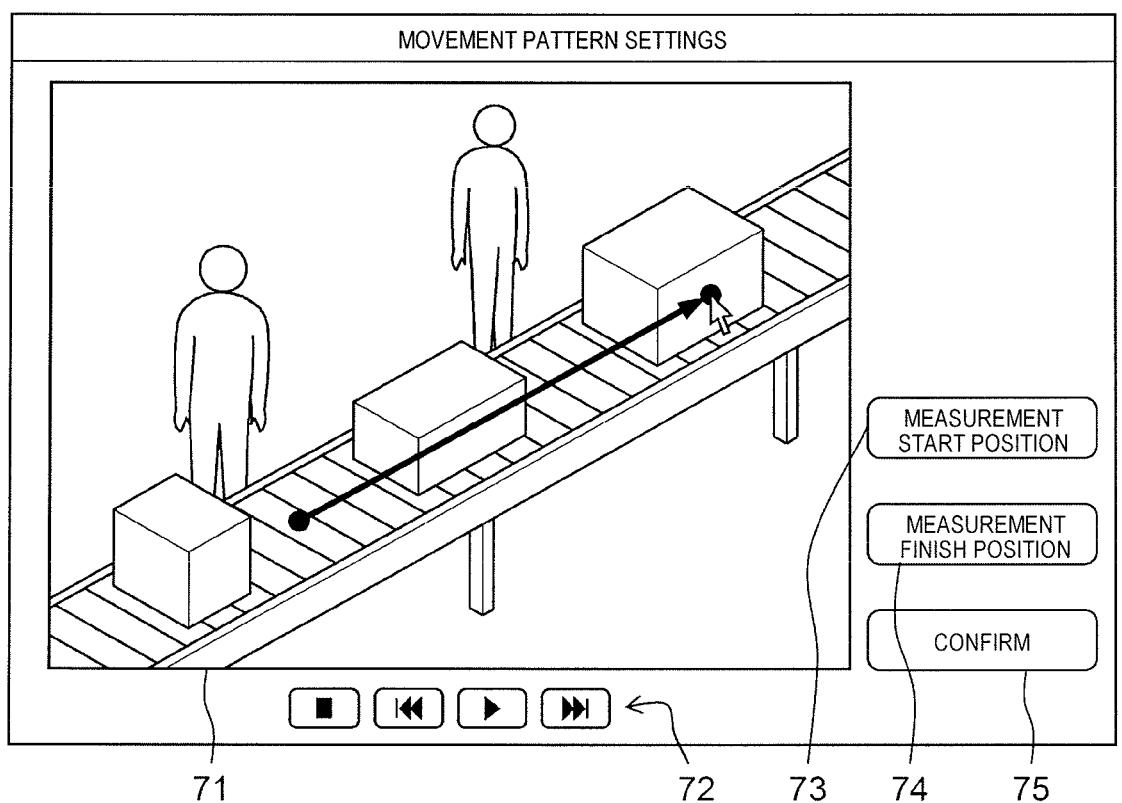
FIG. 8B is an explanatory view that shows a movement pattern settings screen displayed on monitor 4.

Next, manipulation for setting the movement pattern will be described. FIGS. 8A and 8B are explanatory views that show a movement pattern settings screen displayed on monitor 4.

The movement pattern settings screen is a screen on which a user sets the positions of packages seen in video of the monitoring area in order to set the movement pattern of the packages, which correspond to monitoring targets, and a video display portion 71, a playback manipulation portion 72, a measurement start position setting button 73, a measurement finish position setting button 74, and a confirm button 75 are provided on the movement pattern settings screen. Video of the monitoring area is displayed on the video display portion 71, and it is possible to display video of a desired state by manipulating the playback manipulation portion 72.

In the present exemplary embodiment, the movement speed and the movement direction of the packages are set as the movement pattern of the packages, and the movement speed and the movement direction of the packages are determined from positions (a measurement start position and a measurement finish position) of the packages designated by a user in video of a different time. Additionally, the movement speed and the movement direction of the packages transported on the conveyor are fixed, and when the movement speed and the movement direction of a package of interest are acquired, the movement speed and the movement direction can be applied to all of the packages and the conveyor.

More specifically, as shown in FIG. 8A, the playback manipulation portion 72 is manipulated, video in which a package of interest is comparatively positioned on an upstream side of the conveyor is displayed, a user performs a manipulation (for example, a click manipulation of a mouse) that selects the package of interest using input device 6 such as a mouse, and the measurement start position is set when the measurement start position setting button 73 is manipulated. Next, as shown in FIG. 8B, the playback manipulation portion 72 is manipulated, video in which a package of interest is comparatively positioned on a downstream side of the conveyor is displayed, a user performs a manipulation (for example, a click manipulation of a mouse) that selects the package of interest using input device 6 such as a mouse, and the measurement finish position is set when the measurement finish position setting button 74 is manipulated. In addition, a photographing time of video when the measurement start position is set is set as a measurement start time, and a photographing time of video when the measurement finish position is set is set as a measurement finish time.

In this manner, when the measurement start position and the measurement finish position are set, a process that acquires the movement speed and the movement direction of the package on the basis of the positions is performed by movement pattern setter 28. More specifically, it is possible to determine the movement speed from the interval between the measurement start position and the measurement finish position; that is, a movement distance of the package, and the elapsed time from the measurement start time to the measurement finish time. In addition, it is possible to determine the movement direction from a positional relationship between the measurement start position and the measurement finish position.

Additionally, circular images that represent the measurement start position and the measurement finish position are displayed in the video display portion 71, and in addition, an arrow image is displayed in a manner that links the measurement start position and the measurement finish position.

In the above-mentioned manner, in the present exemplary embodiment, the masking invalid region is set in video of the monitoring area in accordance with a manipulation input of a user in masking invalid region setter 27, moving bodies are detected from the video of the monitoring area and region information is acquired for each moving object in moving object detector 31, and selection of whether or not to set the image regions of the moving bodies detected by moving object detector 31 is performed in process target selector 32 in accordance with whether or not the image regions are positioned in the masking invalid region; that is, an image region of a moving object is not set as a target of the masking process in a case in which the image region of the moving object is positioned in the masking invalid region, and an image region of a moving object is set as a target of the masking process in a case in which the image region of the moving object is positioned in regions (masking valid regions) other than the masking invalid region. Further, in video output controller 26, only image regions of moving bodies set as targets of the masking process by process target selector 32 are set as targets and an output video, on which the masking process is implemented, is generated and output.

According to this configuration, a masking process is implemented on image regions of moving bodies positioned in a masking invalid region, and the masking process is not implemented on image regions of moving bodies positioned in a region (a masking valid region) other than the masking invalid region. Therefore, by setting a masking invalid region to be a region in which an object corresponding to a monitoring target is present, a state in which the masking process is implemented in an image region of a person and the masking process is not implemented in an image region of an object corresponding to a monitoring target is attained, and it is possible to suitably check the status of the object corresponding to a monitoring target while achieving protection of the privacy of people. Additionally, from a viewpoint of relatively achieving protection of the privacy the people, the masking invalid region may be set to be as narrow as possible within a range that does not hinder monitoring.

In addition, in the present exemplary embodiment, a movement pattern of a predetermined moving object is set in accordance with a manipulation input of a user in movement pattern setter 28, and selection of whether or not to set the image regions of the moving bodies positioned in the masking invalid region is performed in process target selector 32 in accordance with whether or not moving bodies conform with the movement pattern; that is, an image region of a moving object is not set as a target of the masking process in a case in which the moving object conforms with the movement pattern and an image region of a moving object is set as a target of the masking process in a case in which the moving object does not conform with the movement pattern. According to this configuration, since an object corresponding to a monitoring target conforms with a movement pattern set in advance, an image region of the moving object is not set as a target of the masking process, and therefore, it is possible to avoid a circumstance in which the masking process is performed on the object corresponding to a monitoring target. Further, since it is not likely that a person will perform a movement that conforms with the movement pattern, an image region of a person is set as a target of the masking process, and therefore, it is possible to avoid the inconvenience of the image region of a person positioned in the masking invalid region being displayed in a state in which the masking process has not been performed.

In particular, in the present exemplary embodiment, the movement pattern is stipulated by the movement speed and the movement direction of the moving bodies, and as a result of this, it is possible to perform a process that selects whether or not to set the image regions of moving bodies as targets of the masking process with high accuracy. Additionally, the movement pattern may be stipulated by either one of the movement speed and the movement direction of the moving bodies.

Second Exemplary Embodiment

Next, a second exemplary embodiment will be described. Additionally, features not specifically referred to in this instance are similar to those of the above-mentioned exemplary embodiment.

Figure 9A:
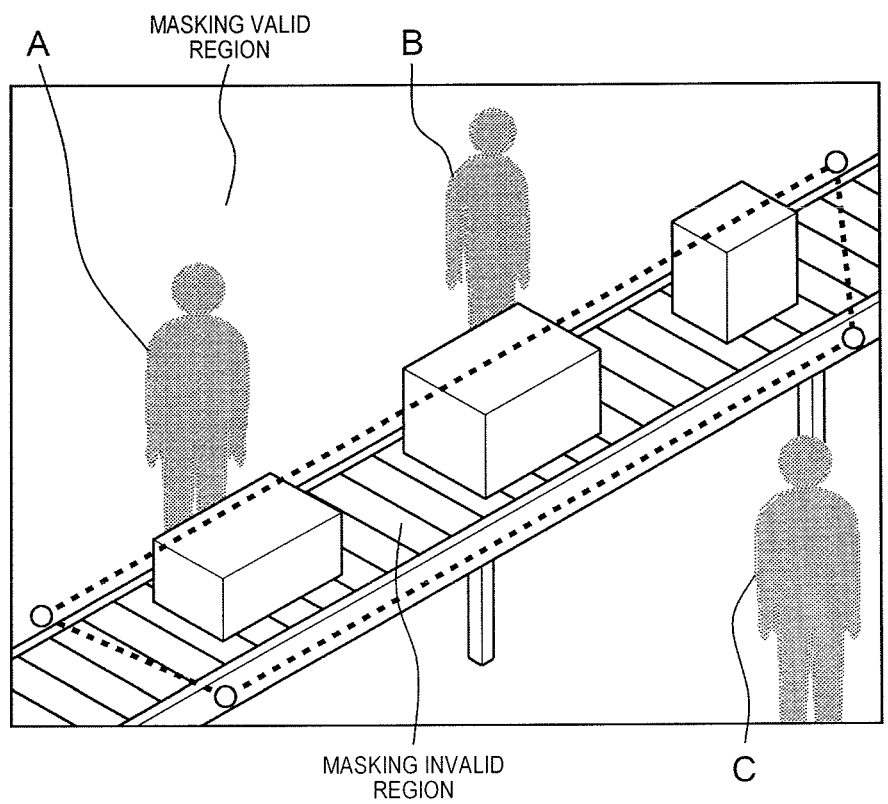
FIG. 9A is an explanatory view that describes a summary of a monitoring process according to a second exemplary embodiment.
Figure 9B:
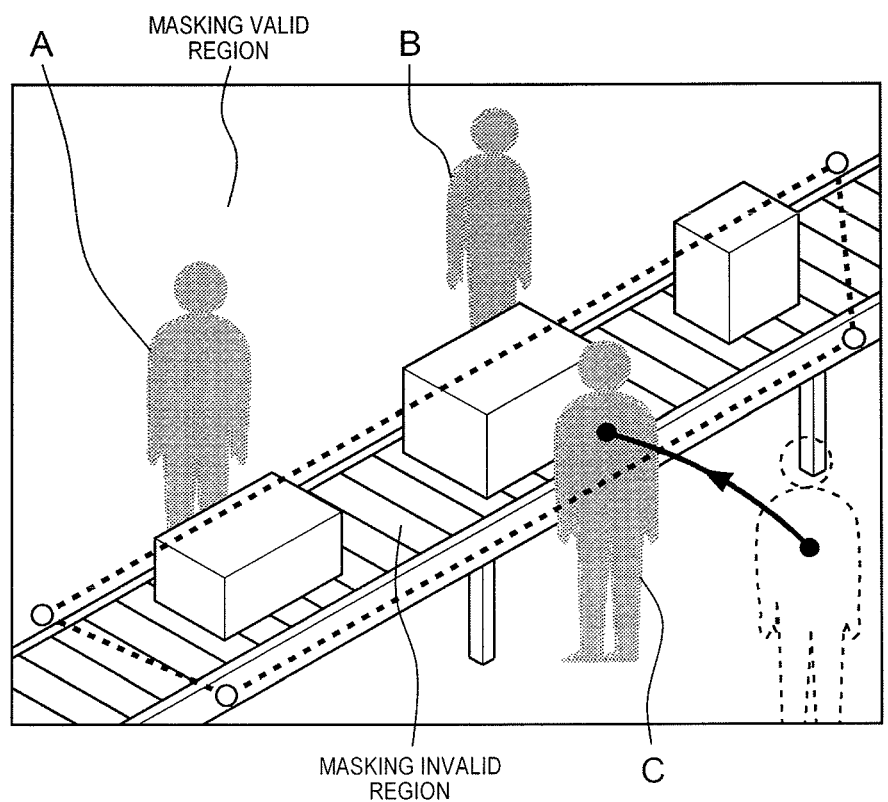
FIG. 9B is an explanatory view that describes a summary of a monitoring process according to the second exemplary embodiment.

FIGS. 9A and 9B are explanatory views that describe a summary of a monitoring process according to the second exemplary embodiment. In the first exemplary embodiment, as shown in FIG. 4A, a conditions of whether or not moving bodies conform with the movement pattern of the packages is added and moving bodies corresponding the targets of the masking process are selected in order to avoid the inconvenience of display in a state in which the masking process has not been performed on an image region of a person that enters the masking invalid region, but in the second exemplary embodiment, it is determined whether or not a moving object is a person, moving bodies determined to be people are tracked, a process that continuously sets a moving object as a target of the masking process is performed in a case in which the moving object enters the masking invalid region, and as a result of this, in a similar manner to that of the first exemplary embodiment, it is possible to avoid the inconvenience of display in a state in which the masking process has not been performed on an image region of a person that enters the masking invalid region. Additionally, the person determination for moving bodies referred to in this instance can be realized by a person detection or a face detection algorithm that uses publicly-known people or face feature quantities.

More specifically, as shown in FIG. 9A, moving bodies (people A to C) that appear in regions (masking valid regions) other than the masking invalid region are all set as targets of the masking process, and the masking process is carried out on all of the moving bodies. In addition, a process that sets the moving bodies that appear in the masking valid region as targets thereof and determines whether or not the moving bodies are people is performed, and tracking is started for moving bodies determined to be people. Further, as shown in FIG. 9B, even if a moving object (the person C) determined to be a person enters the masking invalid region during tracking, the moving object is continuously set as a target of the masking process, and a state in which the masking process is carried out is maintained.

Figure 10:
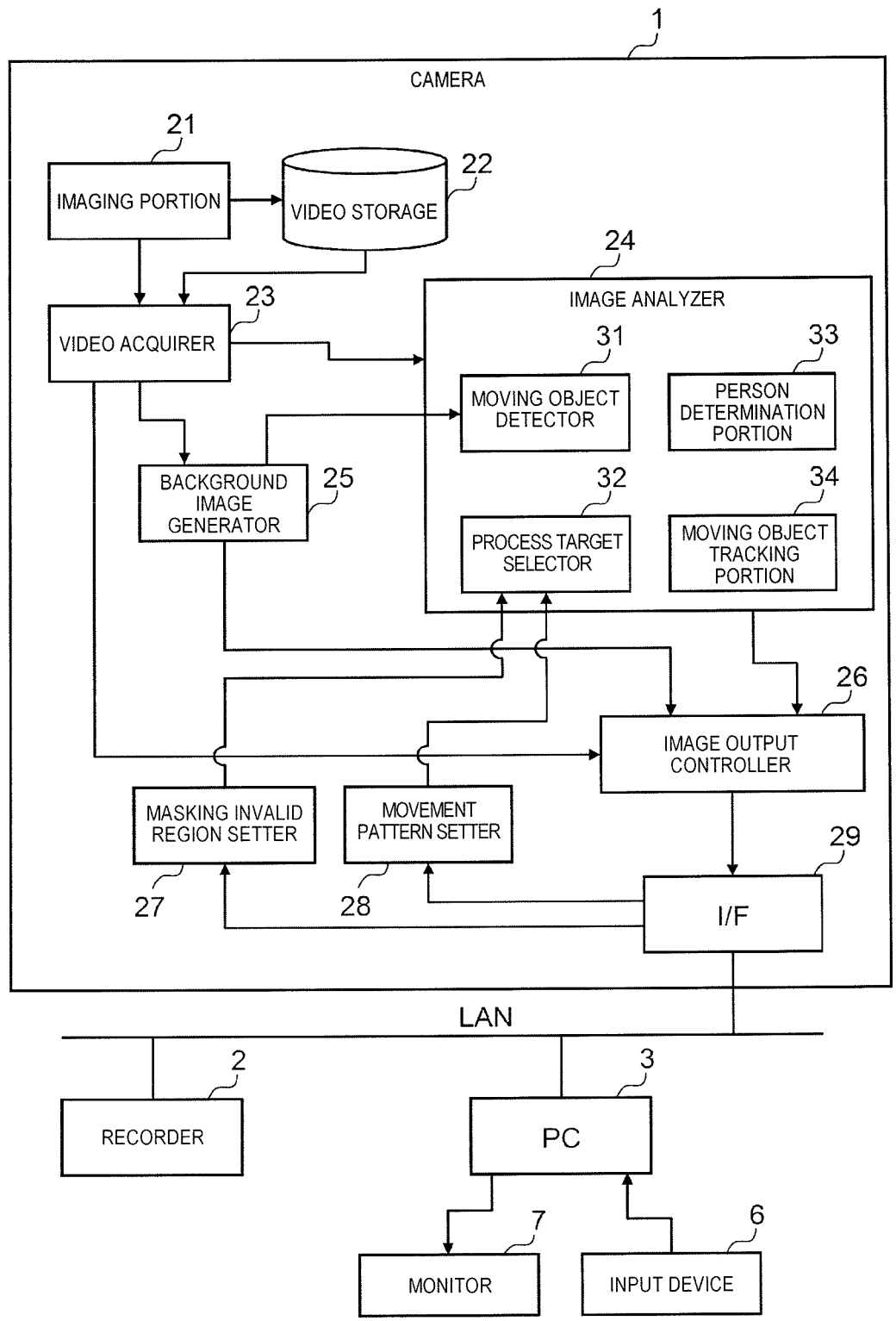
FIG. 10 is a functional block diagram that shows a schematic configuration of camera 1.

Next, a schematic configuration of camera 1 according to the second exemplary embodiment will be described. FIG. 10 is a functional block diagram that shows a schematic configuration of camera 1.

Image analyzer 24 if camera 1 is provided with moving object detector 31 and process target selector 32 in the same manner as the first exemplary embodiment, but in the second exemplary embodiment, image analyzer 24 is further provided with person determination portion 33 and moving object tracking portion 34.

A process that detects moving bodies from video of the monitoring area is performed in moving object detector 31. A process that, among moving bodies detected by moving object detector 31, sets moving bodies positioned in the masking valid region as targets thereof and determines whether or not the moving bodies are people is performed in person determination portion 33. A process that tracks moving bodies determined to be people by person determination portion 33 is performed in moving object tracking portion 34. A process that continuously sets a moving object as a target of the masking process when the moving object, which is a person positioned in the masking invalid region, enters the masking invalid region; that is, when a state in which at least a portion of the image regions of the moving object are overlapping with the masking invalid region is detected, is performed in process target selector 32.

Additionally, the processes performed by person determination portion 33 and moving object tracking portion 34 may only be implemented in a case in which a moving object approaches the masking invalid region, or more specifically, in a case in which the distance from the moving object to the masking invalid region becomes lower than a predetermined threshold value. In addition, since it is not necessarily possible to expect a highly-accurate result in the processes performed by moving object detector 31 and person determination portion 33, the moving object tracking process of moving object tracking portion 34 may be started on the basis of frequency information in a time series obtained from detection results and determination results spanning a plurality of frames as a countermeasure against non-detection and erroneous determination.

In this manner, in the present exemplary embodiment, moving bodies detected by moving object detector 31 are tracked in moving object tracking portion 34, and in process target selector 32, in a case in which a moving object positioned in the masking invalid region enters the masking invalid region after appearing in a region other than the masking invalid region, the image regions of the moving object are continuously set as targets of the masking process, and since there is a high probability that a moving object that appears in a region (a masking valid region) other than the masking invalid region and enters the masking invalid region is a person, by setting the image regions of such a moving object as a target of the masking process, it is possible to avoid the inconvenience of display in a state in which the masking process has not been performed on an image region of a perform positioned in the masking invalid region.

In addition, in the present exemplary embodiment, it is determined whether or not moving bodies detected by moving object detector 31 are people in person determination portion 33, moving bodies determined by person determination portion 33 to be people are tracked in moving object tracking portion 34, and as a result of this, since only moving bodies that are people are set as targets of the masking process, it is possible to avoid a circumstance in which the masking process is performed unnecessarily on an image region of a moving object that is not a person.

Figure 11A:
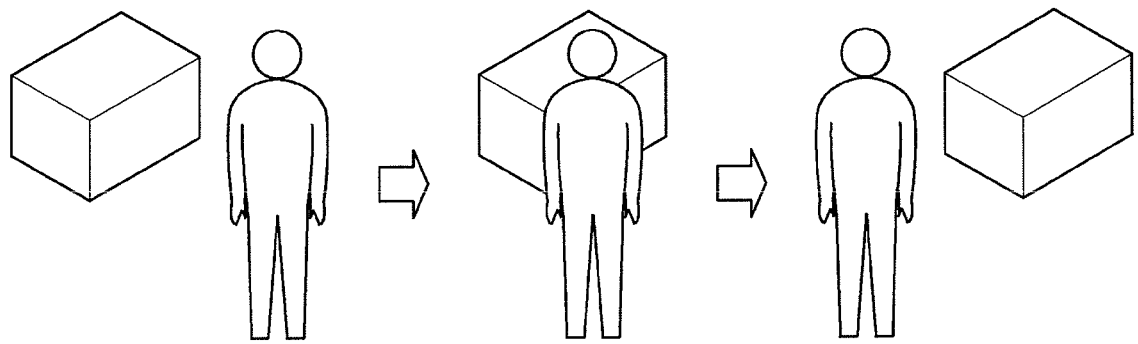
FIG. 11A is an explanatory view that describes a process in a case in which a person and a package overlap in video in which the person and the package are in proximity to one another.
Figure 11B:
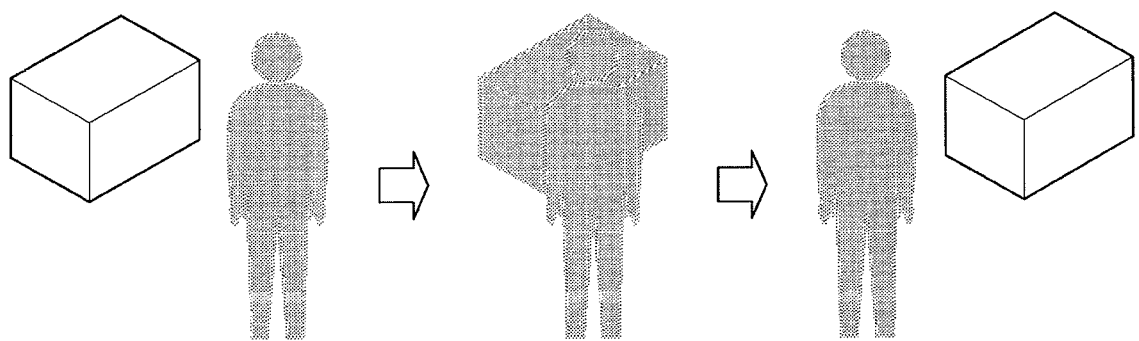
FIG. 11B is an explanatory view that describes a process in a case in which a person and a package overlap in video in which the person and the package are in proximity to one another.
Figure 11C:
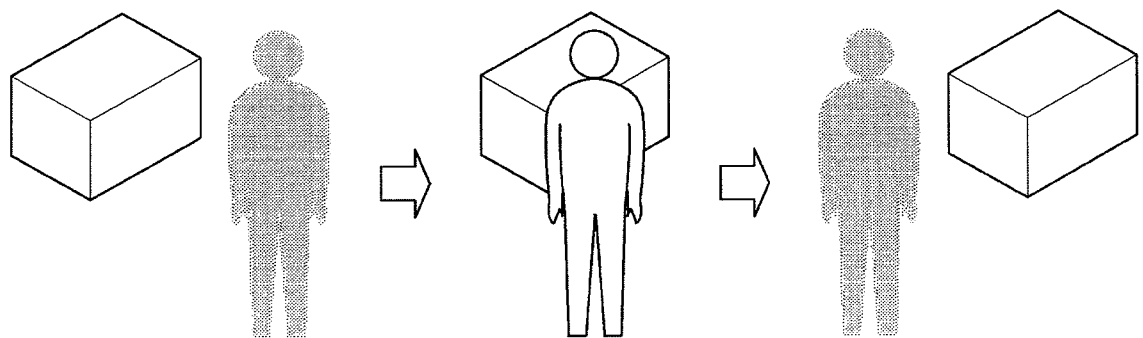
FIG. 11C is an explanatory view that describes a process in a case in which a person and a package overlap in video in which the person and the package are in proximity to one another.

Next, a process in a case in which a person and a package overlap in video in which the person and the package are in proximity to one another will be described. FIGS. 11A to 11C are explanatory views that describe a process in a case in which a person and a package overlap in video in which the person and the package are in proximity to one another.

As shown in FIG. 11A, when a person and a package are in proximity to one another, there are cases in which a state in which the person and the package overlap in video is attained. At this time, a state in which the masking process is only performed on the image regions of the person may be maintained in a case in which it is possible to separate the image regions of the person from the image regions of the package, but there are cases in which it is not possible to separate the image regions of the person from the image regions of the package, and in such cases, there is no alternative but to process the perform and the package as a single moving object.

In such a case, as shown in FIG. 11B, a moving object in which the person and the package are integrated is set as a target of the masking process, and the masking process is carried out on all of the image regions of the moving object, that is, the masking process is carried out on both the person and the package. As a result of this, it is possible to relatively achieve protection of the privacy of the person. Thereafter, when it becomes possible to separate the image regions of the person from the image regions of the package, only the person may be set as a target of the masking process, and the masking process may be carried out on the image regions of the person. In this instance, since the people rarely move in order to track the packages, the state in which a person and a package overlap does not continue for a long period of time, and a state in which the masking process is performed on the image regions of a packages is temporary, there is not a large hindrance when checking of the status of the package.

In addition, the process shown in FIG. 11B may be set as a privacy priority mode, and in addition to this, as shown in FIG. 11C, a mode in which moving bodies in which a person and a package are integrated are not set as targets of the masking process and the masking process is not performed on all of the image regions of the moving object; that is, in which the masking process is not performed on the person as well as the package, may be prepared, and a user may be capable of selecting the mode as appropriate. In this case, it is possible to achieve protection of the privacy of the people if the privacy priority mode is set as an initial state and it is set so that changing of the mode is allowed only in a case of a user that has the authorization to inspect unprocessed video by using user authentication.

Figure 12:
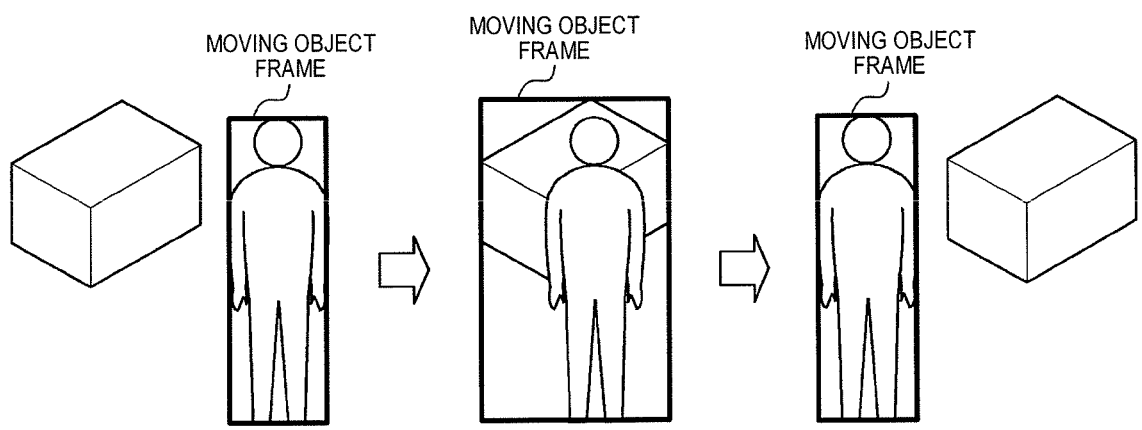
FIG. 12 is an explanatory view that describes a process that detects a state in which a person and a package overlap.

Next, a process that detects a state in which a person and a package overlap will be described. FIG. 12 is an explanatory view that describes a process that detects a state in which a person and a package overlap.

As shown in FIGS. 11A to 11C, when performing a process in a case in which a person and a package overlap, a process that detects a state in which a person and a package are overlapping is necessary. In the detection process, as shown in FIG. 12, a rectangular moving object frame, which surrounds the image regions of a moving object, may be set, and detection of a state in which a person and a package overlap may be performed on the basis of the size of the moving object frame. That is, when a state in which a person and a package overlap in video is entered and the person and the package are recognized as a single moving object, the size of the moving object frame changes greatly, and it is possible to detect a state in which a person and a package overlap as a result of the change in the size of the moving object frame.

Figure 13:
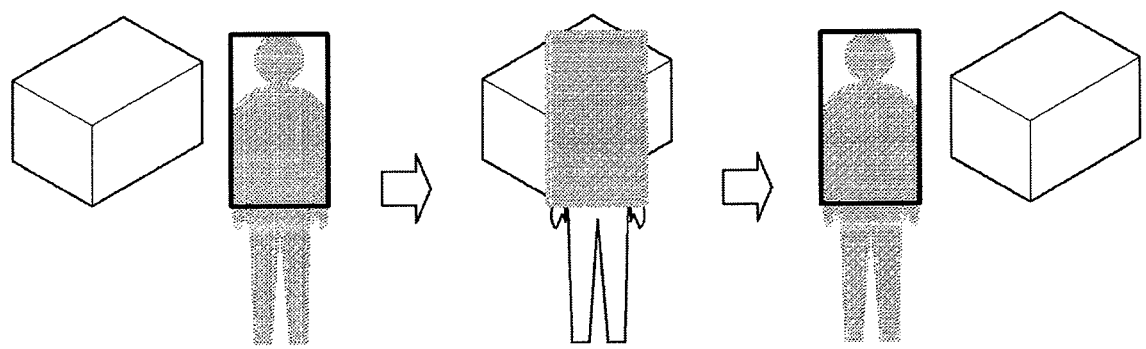
FIG. 13 is an explanatory view that describes another example of a process in a case in which a person and a package overlap in video in which the person and the package are in proximity to one another.

Next, another example of a process in a case in which a person and a package overlap in video in which the person and the package are in proximity to one another will be described. FIG. 13 is an explanatory view that describes another example of a process in a case in which a person and a package overlap in video in which the person and the package are in proximity to one another.

When a moving object is detected from video of the monitoring area, a person frame, which surrounds an appropriate site (for example, the upper half of the body or a head portion) of a person, is set, and the masking process is carried out on the person frame. That is, in a case in which it is possible to separate the image regions of a person from the image regions of a package, the masking process is carried out on all of the image regions of the person, and in a case in which it is not possible to separate the image regions of a person from the image regions of a package, in the image regions of a moving object in which the person and the package are integrated, regions for which there is a high probability of being image regions of a person are extracted from a state of an immediately preceding person frame at a similar size to that of the person frame, and the masking process is carried out on the regions.

Third Exemplary Embodiment

Next, a third exemplary embodiment will be described. Additionally, features not specifically referred to in this instance are similar to those of the above-mentioned exemplary embodiment.

Figure 14:
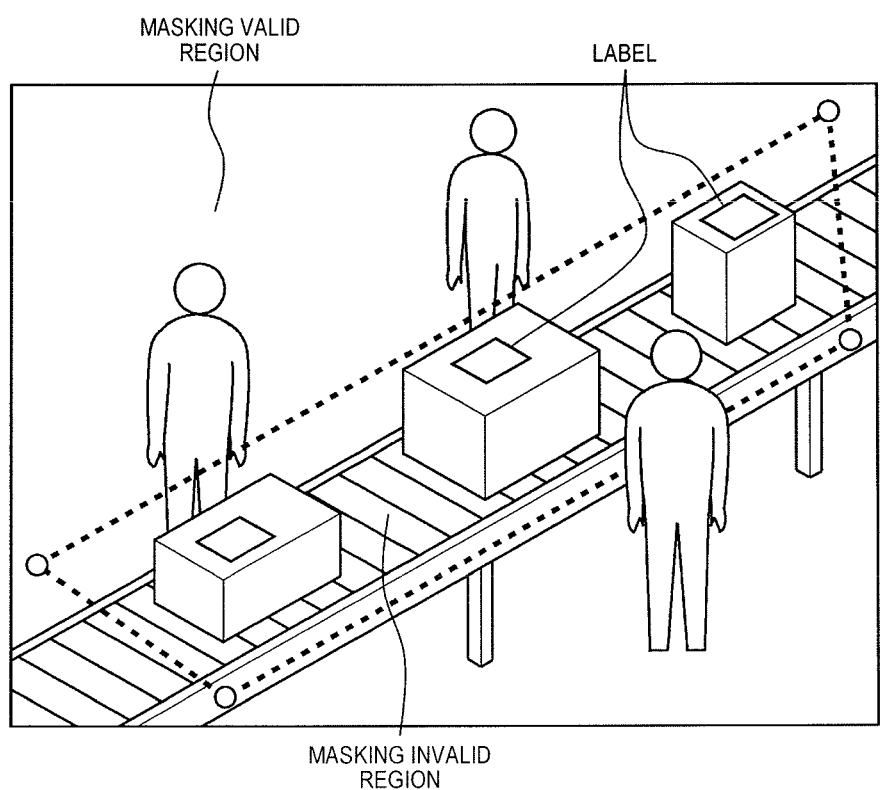
FIG. 14 is an explanatory view that describes a summary of a monitoring process according to a third exemplary embodiment.

FIG. 14 is an explanatory view that describes a summary of a monitoring process according to the third exemplary embodiment. In the first exemplary embodiment, people and packages are identified on the basis of a movement pattern, but in the third exemplary embodiment, a process that detects a fixed image (for example, a barcode, or the like), which is illustrated on a label (for example, a delivery slip, or the like) affixed to a package, in image regions of moving bodies is performed, and when a fixed image is detected in an image region of a moving object, the moving object is determined to be a package and is not set as a target of the masking process.

In this manner, in the present exemplary embodiment, when a fixed image that represents a predetermined moving object is detected in an image region of a moving object positioned in the masking invalid region, the image regions of the moving object are not set as targets of the masking process as targets of the masking process in process target selector 32. According to this configuration, since an image region of an object corresponding to a monitoring target is not set as a target of the masking process due to the detection of a fixed image, it is possible to avoid a circumstance in which the masking process is performed on the object corresponding to a monitoring target. Further, since a fixed image is not detected in an image region of a person, an image region of a person is set as a target of the masking process, and therefore, it is possible to avoid the inconvenience of the image region of a person positioned in the masking invalid region being displayed in a state in which the masking process has not been performed.

Fourth Exemplary Embodiment

Next, a fourth exemplary embodiment will be described. Additionally, features not specifically referred to in this instance are similar to those of the above-mentioned exemplary embodiment.

Figure 15:
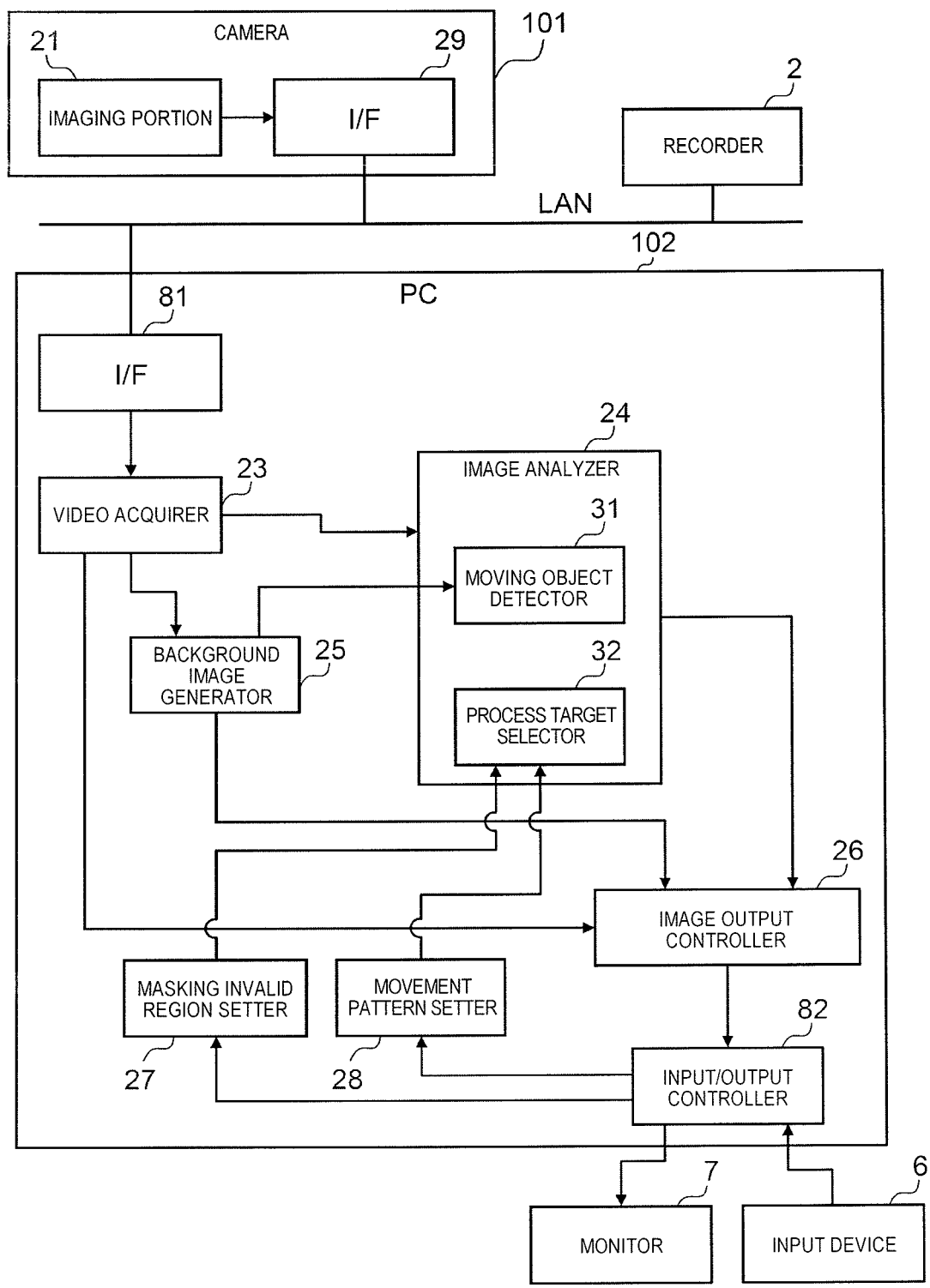
FIG. 15 is a functional block diagram that shows a schematic configuration of camera 101 and PC 102 in a fourth exemplary embodiment.

FIG. 15 is a functional block diagram that shows a schematic configuration of camera 101 and PC 102 in the fourth exemplary embodiment. In the fourth exemplary embodiment, video acquirer 23, image analyzer 24, background image generator 25, video output controller 26, masking invalid region setter 27, and movement pattern setter 28, which are provided in camera 1 in the first exemplary embodiment, are provided in PC 102.

Imaging portion 21 is provided in camera 101, and video of the monitoring area imaged in camera 101 is transmitted to PC 102 via interface 29. In addition, video output from imaging portion 21 is transmitted to recorder 2 via interface 29, and the video is accumulated on recorder 2.

In video acquirer 23 of PC 102, video of the monitoring area is acquired from camera 101 or recorder 2 via an interface 81. In addition, a process that acquires input information that depends on a manipulation input of a user, performed using input device 6, via an input/output controller 82, and sets the masking invalid region and the movement pattern on the basis of the input information is performed in masking invalid region setter 27 and movement pattern setter 28. The processes performed in image analyzer 24, background image generator 25, and video output controller 26 are similar to those of the first exemplary embodiment.

Additionally, each portion of PC 102 shown in FIG. 15 is realized by causing a processor (a CPU) of PC 102 to execute monitoring programs (instructions), which is saved in a memory such as a HDD. In addition to being introduced into PC 102 as an information processing device and configuring dedicated devices, the programs may be recorded on an appropriate program recording medium as application programs that are operated in a predetermined OS, and, in addition, may be provided to a user via a network.

The present disclosure has been described above on the basis of specific exemplary embodiments, but the exemplary embodiments are merely illustrative examples, and the present disclosure is not limited by the exemplary embodiments. In addition, not all of the constituent elements of the monitoring device and monitoring method according to the present disclosure, which are shown in the above-mentioned exemplary embodiments, are necessarily essential, and can be selected as appropriate within a range that does not depart from at least the scope of the present disclosure.

For example, in the above-mentioned exemplary embodiments, description was given using the example of a distribution center, but the present disclosure is not limited to such a distribution center, and for example, can be applied to an assembly line of a factory, or the like. In particular, a case in which the monitoring area is set as a work area in which articles are transported by a transport device and articles transported by the transport device are set as monitoring targets is suitable. In this case, it is sufficient to set the image regions of the articles and the transport device in video of the monitoring area as the masking invalid region.

In addition, in the above-mentioned exemplary embodiments, masking process video on which the masking process is implemented is output from video output controller 26 of camera 1, but the original video of the image regions corresponding to targets of the masking process may also be output simultaneously, and the masking process may be canceled either partially or fully in accordance with manipulation by using PC 3. For example, by performing a manipulation that selects a moving object or a manipulation that designates a region in the video, the masking process of the selected moving object or the designated region may be canceled. In this case, it is possible to achieve protection of the privacy of the people if it is set so that cancellation of the masking process is allowed only in a case of a user that has the authorization to inspect unprocessed video by using user authentication.

In addition, in the above-mentioned exemplary embodiments, the masking process video is output from camera 1 and the masking process video is inspected by using PC 3, but unprocessed masking process video on which the masking process is not implemented may also be output from camera 1. In this case, it is possible to achieve protection of the privacy of the people if a mode that output the masking process video is set as an initial state and it is set so that the output of unprocessed video is allowed only in a case of a user that has the authorization to inspect unprocessed video by using user authentication.

In addition, both the masking process video and unprocessed video may be output from camera 1, or unprocessed and meta-information (position information of moving bodies and information relating to image regions set as targets of the masking process) may be output from camera 1, and on PC 3, it may be possible to switch between a mode that displays the masking process video and a mode that displays the unprocessed video. In this case, it is also possible to achieve protection of the privacy of the people if it is set so that display of the unprocessed video is allowed only in a case of a user that has the authorization to inspect unprocessed video by using user authentication.

In addition, in the above-mentioned exemplary embodiments, processes required in monitoring are performed by camera 1 and PC 3 provided in a facility (a distribution center), but as shown in FIG. 1, the required processes may be performed by PC 11 provided in the headquarters, or cloud computer 12 that configures a cloud computing system. In addition, the required processes may be shared by a plurality of information processing devices, and information may be delivered between the plurality of information processing devices via a communication medium such as an IP network or a LAN. In this case, a monitoring system is configured by a plurality of information processing devices that share the required processes.

In addition, in the above-mentioned exemplary embodiments, description is given using an example in which PC 3 of a facility (a distribution center), which is connected to camera 1 and recorder 2 via a LAN installed in the facility, is set as an inspection device that inspects video of a monitoring area (a work floor), but as shown in FIG. 1, PC 11 of the headquarters may be connected to camera 1 and recorder 2 via a network outside the facility, that is, a wide area network such as a WAN, and PC 11 of the headquarters may be set as an inspection device, and furthermore, a portable terminal such as smartphone 13 or tablet terminal 14 may be set as an inspection device, and as a result of this, it may be possible to inspect video of the monitoring area in an arbitrary location such as a work trip destination other than the facility and the headquarters.

INDUSTRIAL APPLICABILITY

The monitoring device and the monitoring method according to the present disclosure have an effect of being capable of suitably checking the status of an object corresponding to a monitoring target while achieving protection of the privacy of people in a case in which an object that moves in a similar manner to a person is set as a target for monitoring, and are useful as a monitoring device, a monitoring method, or the like, that generates and outputs an output video on which a masking process, which changes an image region of a moving object detected from video of a monitoring area into a masking image, is implemented.

REFERENCE MARKS IN THE DRAWINGS

1 camera (monitoring device)
2 recorder
3 PC
4 monitor
6 input device
11 PC
12 cloud computer
13 smartphone
14 tablet terminal
21 imaging portion
22 video storage
23 video acquirer
24 image analyzer
25 background image generator
26 video output controller
27 masking invalid region setter
28 movement pattern setter
31 moving object detector
32 process target selector
101 camera
102 PC (monitoring device)

The invention claimed is:

1. A monitoring device generating and outputting an output video on which a masking process, which changes an image region of a moving object detected from video of a monitoring area into a masking image, is implemented, the device comprising a processor that:
   sets a masking invalid region in a video of the monitoring area in accordance with a manipulation input of a user;
   detects a moving object from the video of the monitoring area and acquires image region information for each moving object;
   sets, as a target of the masking process, an image region of the detected moving object as a target of the masking process; and
   generates and outputs an output video in which the masking process is implemented on the image region of the moving object set as the target of the masking process,
   wherein the masking process is not implemented on at least one object positioned in the masking invalid region, and
   wherein, in a case in which the moving object enters the masking invalid region after appearing in a region other than the masking invalid region, the controller continuously sets the image region of the moving object as the target of the masking process.

2. The monitoring device of claim 1, wherein the processor further sets a movement pattern of a predetermined moving object in accordance with a manipulation input of the user, and
   wherein the processor selects whether or not to set an image region of a moving object positioned in the masking invalid region as a target of the masking process in accordance with whether or not the moving object and the movement pattern conform with one another.

3. The monitoring device of claim 2,
   wherein the movement pattern is stipulated by using at least one of a movement speed and a movement direction of a moving object.

4. The monitoring device of claim 1,
wherein, when a fixed image that represents a predetermined moving object is detected in an image region of a moving object positioned in the masking invalid region, the processor does not set the image region of the moving object as a target of the masking process.

5. The monitoring device of claim 1,
wherein the processor further determines whether or not a moving object detected is a person, and
wherein the processor tracks the moving object determined to be a person.

6. The monitoring device of claim 1, wherein both the moving object in a masked state and the at least one object positioned in the masking invalid region in an unmasked state are simultaneously displayed together when the moving object is located within the masking invalid region.

7. The monitoring device of claim 1, wherein the masking process masks over an outline of the detected moving object.

8. The monitoring device of claim 1, wherein the masking process is not applied to inanimate objects located in the masking invalid region.

9. The monitoring device of claim 1, wherein the masking process is not performed in the invalid region when the moving object is located outside of the masking invalid region.

10. A monitoring method causing an information processing device to perform a process that generates and outputs an output video on which a masking process, which changes an image region of a moving object detected from video of a monitoring area into a masking image, is implemented, the method comprising:
setting, by a processor, a masking invalid region in video of the monitoring area in accordance with a manipulation input of a user;
detecting, by the processor, a moving object from the video of the monitoring area and acquiring region information for each moving object;
setting, as a target of the masking process, an image region of the detected moving object as a target of the masking process; and
generating and outputting, by the processor, an output video in which the masking process is implemented on the image region of the moving object set as the target of the masking process,
wherein the masking process is not implemented on at least one object positioned in the masking invalid region, and
wherein, in a case in which the moving object enters the masking invalid region after appearing in a region other than the masking invalid region, the controller continuously sets an image region of the moving object as the target of the masking process.

* * * * *